United States Patent [19]

Inoue et al.

[11] Patent Number: 4,842,832

[45] Date of Patent: Jun. 27, 1989

[54] ULTRA-FINE SPHERICAL PARTICLES OF METAL OXIDE AND A METHOD FOR THE PREPARATION THEREOF

[75] Inventors: Hakuai Inoue; Hiroshi Komiyama, both of Tokyo, Japan

[73] Assignee: Idemitsu Kosan Company Limited, Tokyo, Japan

[21] Appl. No.: 172,970

[22] Filed: Mar. 21, 1988

Related U.S. Application Data

[63] Continuation of Ser. No. 928,280, Oct. 23, 1986, abandoned.

[30] Foreign Application Priority Data

Mar. 5, 1985 [JP] Japan .................................. 60-41828
Apr. 4, 1985 [JP] Japan .................................. 60-71639

[51] Int. Cl.⁴ ............................................ C01L 17/00
[52] U.S. Cl. ........................... 423/211; 423/22; 423/44; 423/49; 423/59; 423/62; 423/76; 423/88; 423/96; 423/97; 423/107; 423/133; 423/149; 423/583; 423/592; 423/6.04; 423/608; 423/609; 423/610; 423/611; 423/612; 423/618; 423/623; 423/624; 423/625; 423/641; 501/108; 501/102; 501/123; 501/126; 501/134; 501/152; 502/8; 502/300; 502/302; 502/308; 502/324; 502/325; 502/340; 502/344; 502/349; 502/353

[58] Field of Search ................. 423/76, 608, 609, 610, 423/611, 21.1, 22, 44, 49, 59, 62, 88, 96, 97, 107, 133, 149, 583, 592, 604, 605, 606, 617, 618, 623, 624, 635, 641; 501/102, 123, 108, 126, 134, 152; 502/8, 302, 305, 349, 344, 300, 324, 325, 340, 353

[56] References Cited

U.S. PATENT DOCUMENTS

| | | | |
|---|---|---|---|
| 3,297,414 | 6/1964 | Mazdiyashi et al. | 423/609 |
| 3,796,793 | 6/1978 | Metzer et al. | 423/325 |
| 4,241,042 | 12/1980 | Matijevie et al. | 423/610 |

FOREIGN PATENT DOCUMENTS

| | | | |
|---|---|---|---|
| 1383774 | 7/1963 | France | 423/592 |
| 4746274 | 11/1972 | Japan | 423/610 |
| 54-99796 | 8/1979 | Japan | 423/610 |
| 59-107905 | 6/1984 | Japan | 423/610 |
| 59-1079904 | 6/1984 | Japan | 423/610 |
| 60-166025 | 8/1985 | Japan | 423/610 |
| 0186418 | 9/1985 | Japan | 423/610 |
| 58-172233 | 10/1988 | Japan | 423/610 |

OTHER PUBLICATIONS

Funaki et al., "Study on the Preparation of TiO₂ by Hydrolysis of TiC₁₄" p. 64.

Primary Examiner—Robert L. Stoll
Assistant Examiner—Paige C. Harvey
Attorney, Agent, or Firm—Frishauf, Holtz, Goodman & Woodward

[57] ABSTRACT

Ultra-fine spherical particles of a metal oxide having an average particle diameter of 40 nm or smaller can be prepared by a method in which a vaporizable metal compound is vaporized and decomposed under heating to give ultra-fine particles of a metal oxide followed by immediate cooling down to a temperature at which coalescence of the fine particles are prevented from coalescence. The fine particles have characteristics such as an excellent power of ultraviolet scattering.

8 Claims, 37 Drawing Sheets

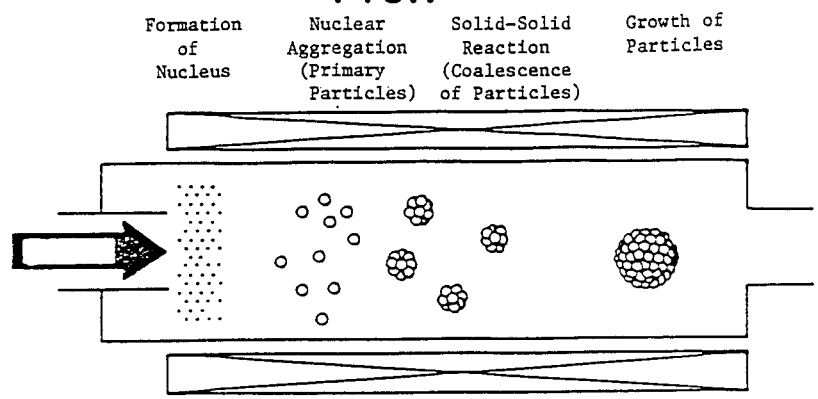
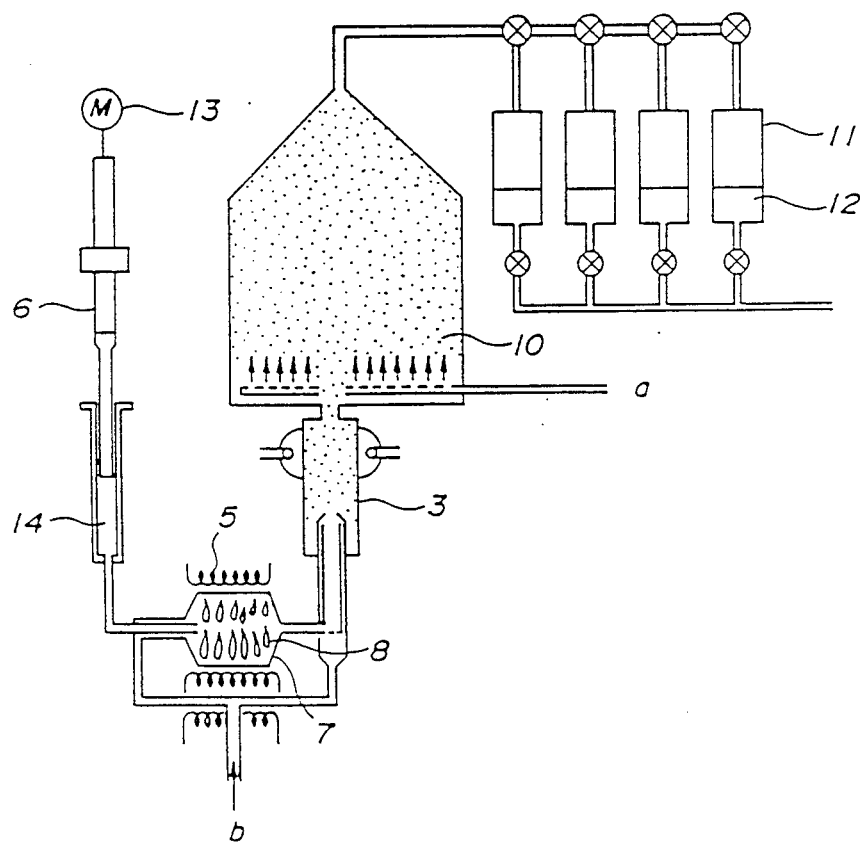

0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm 0.1 μm

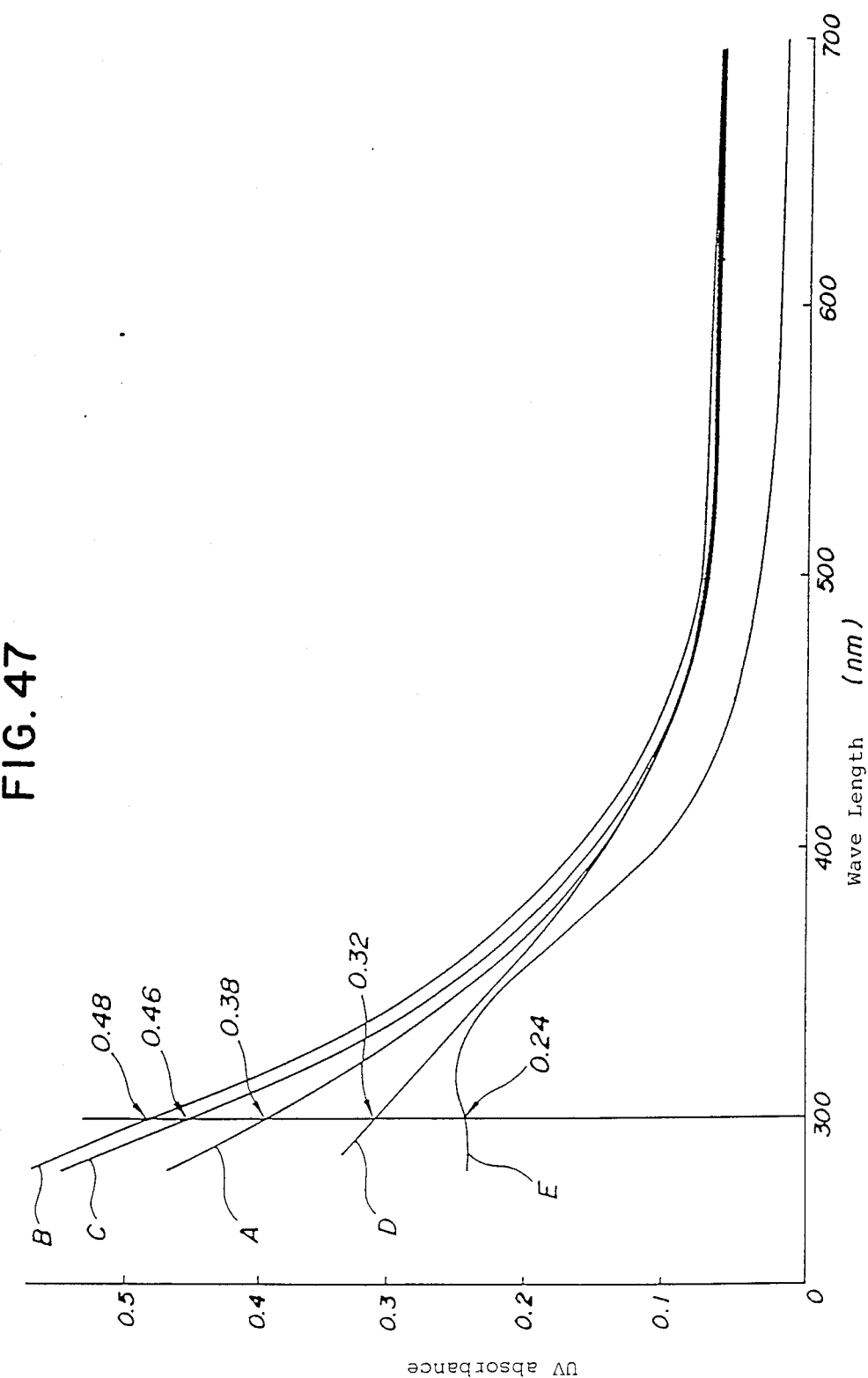

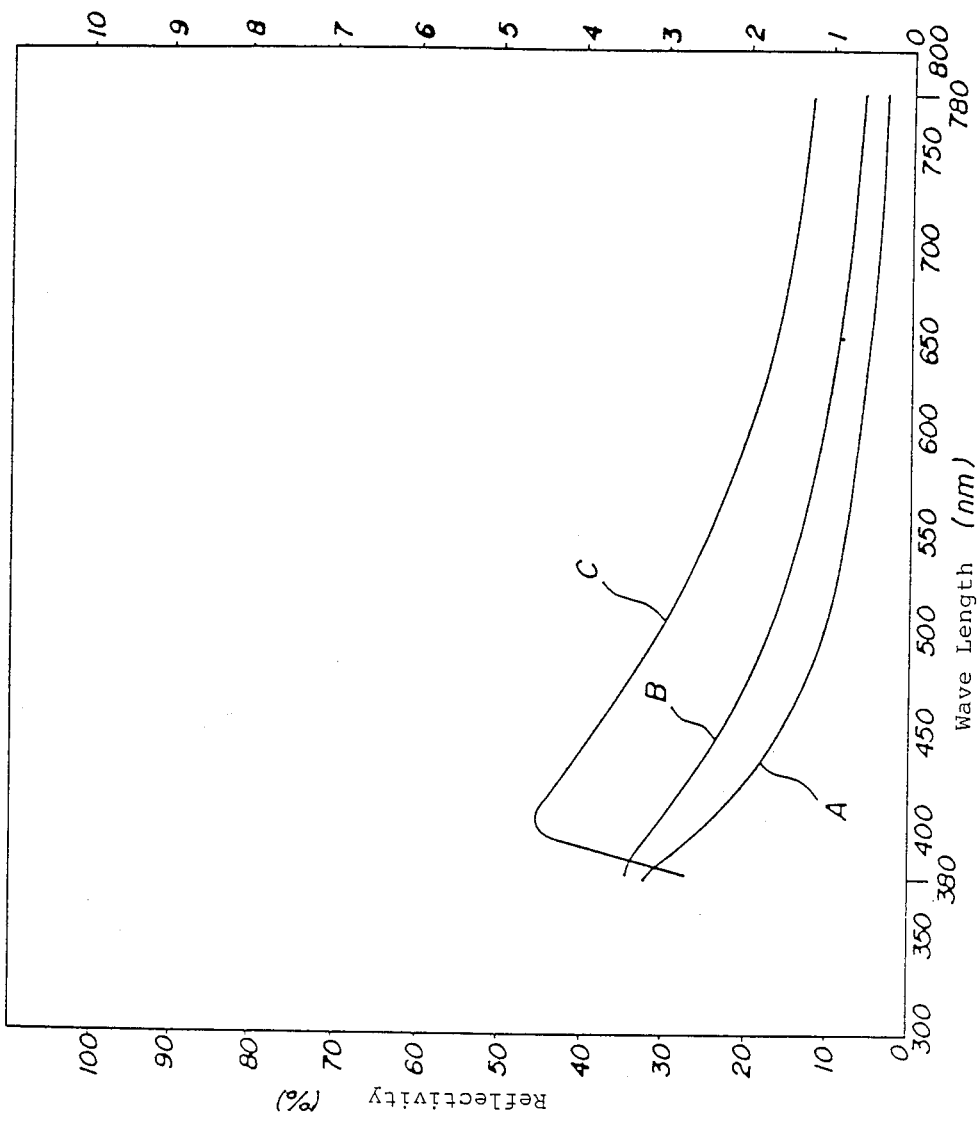

ULTRA-FINE SPHERICAL PARTICLES OF METAL OXIDE AND A METHOD FOR THE PREPARATION THEREOF

This application is a continuation of application Ser. No. 928,280, filed Oct. 23, 1986 now abandoned.

FIELD OF TECHNOLOGY

This invention relates to ultra-fine spherical particles of a metal oxide having an average particle diameter of 40 nm or smaller and a particle diameter distribution in the range from 5 to 50 nm and a method for the preparation thereof.

BACKGROUND TECHNOLOGY

Various methods are known as a method for the preparation of fine particles of an oxide of a metal such as titanium, zirconium and the like.

Titanium dioxide, for example, is widely used in the fields of cosmetics, paints and other by virtue of the excellent weatherability and strong hiding power. Known methods for the preparation of titanium dioxide include the sulfuric acid process in which an aqueous solution of titanium sulfate is neutralized followed by calcination of the thus formed precipitates and the chlorine process in which titanium tetrachloride is pyrolyzed and oxidized at a high temperature. In these conventional methods for the preparation of titanium dioxide of rutile type, however, growth of particles takes place in the course of the manufacturing process so that the diameter of the thus produced titanium dioxide particles is so large as to exceed 1 $\mu$m.

According to the disclosure by Funaki, Saeki, et al. in Kogyo Kagaku Zasshi, vol. 59, No. 11, page 1291 (1956), it was established that fine particles of anatase-type titanium dioxide can be produced by mixing titanium tetrachloride and water in the vapor phase at a temperature in the range from 200° to 800° C. or fine particles of anatase-type titanium dioxide containing or not containing a very small amount of rutile-type particles can be produced by the reaction of titanium tetrachloride and water in the liquid phase. These methods, however, can produce only particles of irregular shapes and no spherical particles can be obtained thereby.

As a method for preparing spherical particles of a metal oxide, on the other hand, there are known a method in which a hydrolyzable titanium (IV) compound in the form of a liquid aerosol is hydrolyzed by being contacted with water vapor in a dynamic flow (see U.S. Pat. No. 4,241,042 and a method in which a precursor of a metal oxide in the form of a very fine droplet suspension of the liquid is heated and gasified by evaporation and thermal decomposition and then contacted and reacted with an oxygen-containing gas in the vapor phase to give spherical fine particles of the metal oxide (see Japanese Patent Kokai 59-107904 and 59-107905).

The spherical metal oxide particles obtained in each of these methods, however, have an average particle diameter of at least 50 nm with, in addition, variations in the particle diameter.

In order to improved on the prior art, the inventors have previously proposed a method according to which titanium dioxide in a spherical and extremely fine particulate form can be prepared by the thermal decomposition of a titanium alkoxide (Japanese Patent Application laid-open 60-186418.)

Although spherical and ultra-fine particles of titanium dioxide can be formed in a relatively simple procedure according to this method, a problem therein is that the titanium dioxide particles finally obtained cannot be spherical and ultra-fine unless the concentration is extremely low due to the bonding and coalescence of the ultra-fine particles of titanium dioxide as formed.

The present invention relates to a method for the preparation of ultra-fine spherical particles of a metal oxide freed from the above described problems and the object thereof is to prepare ultra-fine spherical particles of a metal oxide, in the decomposition of a vaporizable metal compound to form ultra-fine particles of the metal oxide, by preventing coalescence of the particles.

DISCLOSURE OF THE INVENTION

The present invention provides ultra-fine spherical particles of a metal oxide having an average particle diameter of 40 nm or smaller and a particle diameter distribution in the range from 5 to 50 nm and a method for the preparation of ultra-fine spherical particles of a metal oxide having an average particle diameter of 40 nm or smaller and a particle diameter distribution in the range from 5 to 50 nm characterized in that a vaporizable metal compound is vaporized and then decomposed by heating to be converted into ultra-fine particles of the metal oxide and the decomposition is immediately followed by cooling to a temperature at which no coalescence of the above mentioned ultra-fine particles of the metal oxide takes place.

The decomposition of the vaporizable metal compound as the starting material can be mere thermal decomposition but is performed preferably in the presence of water vapor with heating and, in particular, it is preferable that the decomposition is performed in the presence of 30 to 120 times by moles of water vapor based on the metal compound. Further, the decomposition of the metal compound should be performed at a temperature of 600° C. or below.

The metal oxide according to the present invention is mainly an oxide of titanium or an oxide of zirconium and is in a spherical form having a small particle diameter with little variation in the particle diameter.

BRIEF DESCRIPTION OF THE DRAWINGS

FIG. 1 shows an apparatus for preparing ultra-fine particles according to the invention;

FIGS. 2 and 3 show alternative embodiments of the apparatus of FIG. 1;

FIG. 47 is a graph showing the results of the ultraviolet absorbance in Example 25 and Comparative Example 9;

FIG. 66 is a graph showing the transmissivity of visible light in various Examples hereof.

Figure 3:
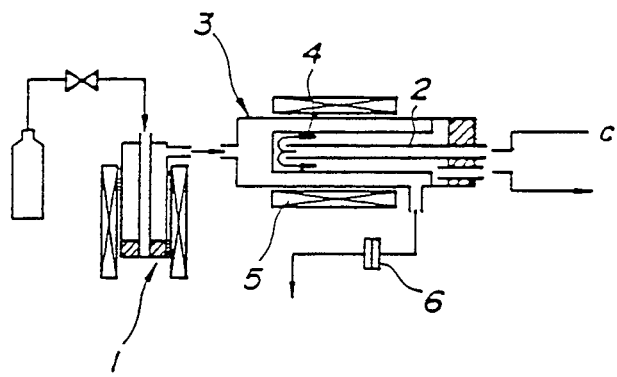

In the figures illustrating various embodiments of the apparatus used to practice the invention;
 a shows helium for cooling;
 b shows carrier gas;
 c shows air for cooling;
 d shows cooling water; and
 e shows high temperature steam.

In the figures showing X-ray diffraction characteristics, $\theta$ is the Bragg angle.

The results of comparing the invention with related means is discussed below, and as is summarized in the drawings:

FIGS. 21 to 43 are each an electron microphotograph showing the particulate structure of the fine particles of titanium oxide obtained in Examples 8 to 11, Comparative Examples 3 and 4, Examples 12 to 16, Comparative Examples 5 and 6, Examples 17 to 24 and Comparative Examples 7 and 8, respectively, of the present invention.

FIG. 47 is a graph showing the results of the ultraviolet absorbance in Example 25 and Comparative Example 9. In the figure, A, B, C, D and E were obtained by using the products in Example 8, Example 10, Example 11, Comparative Example 3 and Comparative Example 9, respectively.

Figure 49:
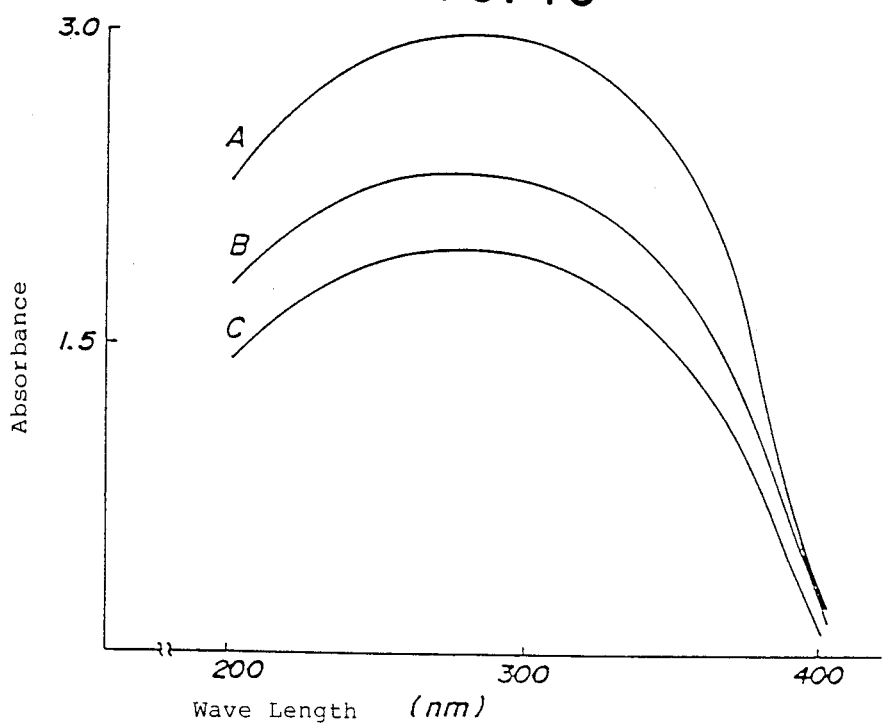
FIG. 49 gives the curves showing the absorbance by various kinds of titanium oxide samples in the wave length range from 200 to 400 nm.
Figure 48:
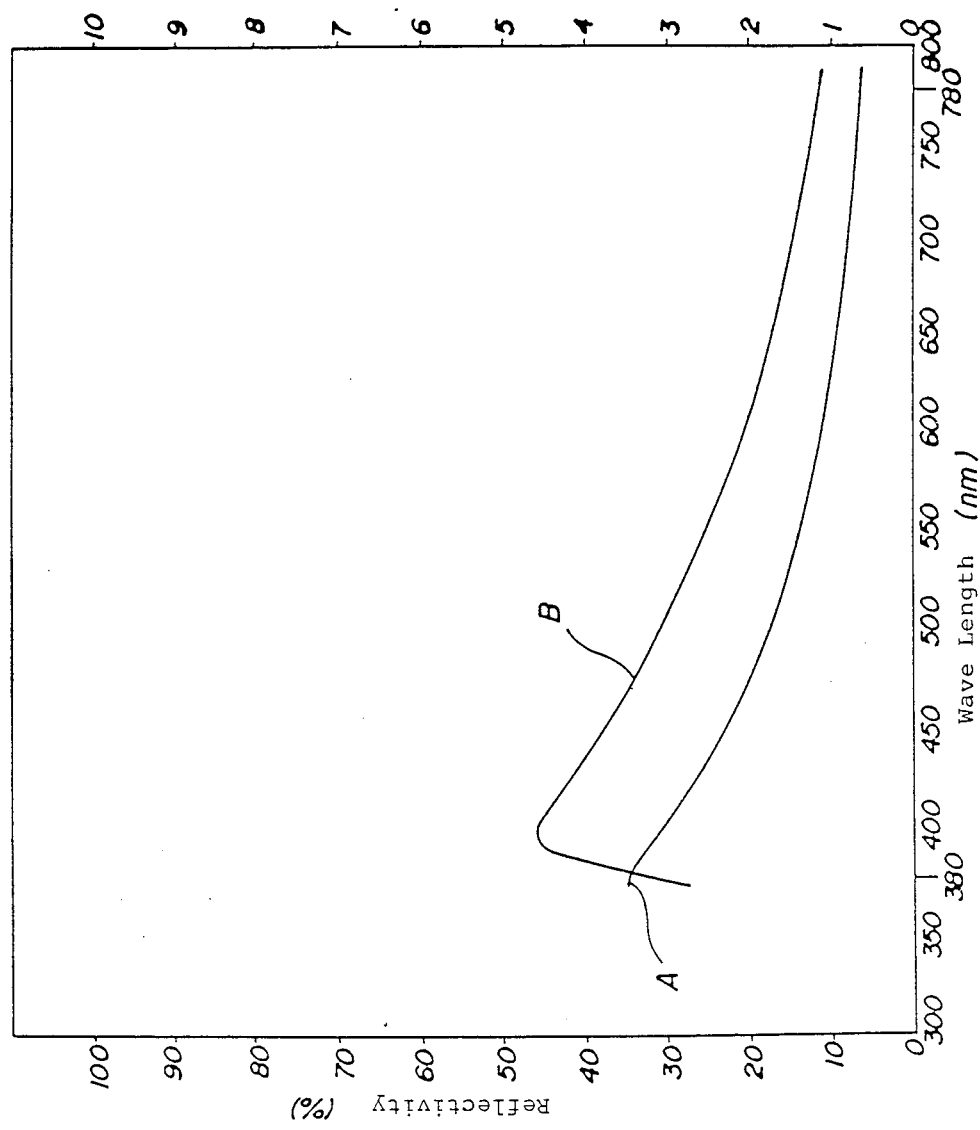
FIG. 48 is a graph showing the color tone of visible light in application Example 1.

FIG. 48 is a graph showing the color tone of visible light in Application Example 1, in which A and B show the case using the fine particles of titanium oxide of the present invention and the case using the fine particles of titanium oxide for comparative purpose and FIG. 49 gives the curves showing the absorbance by various kinds of titanium oxide samples in the wave length range from 200 to 400 nm.

Figure 50:
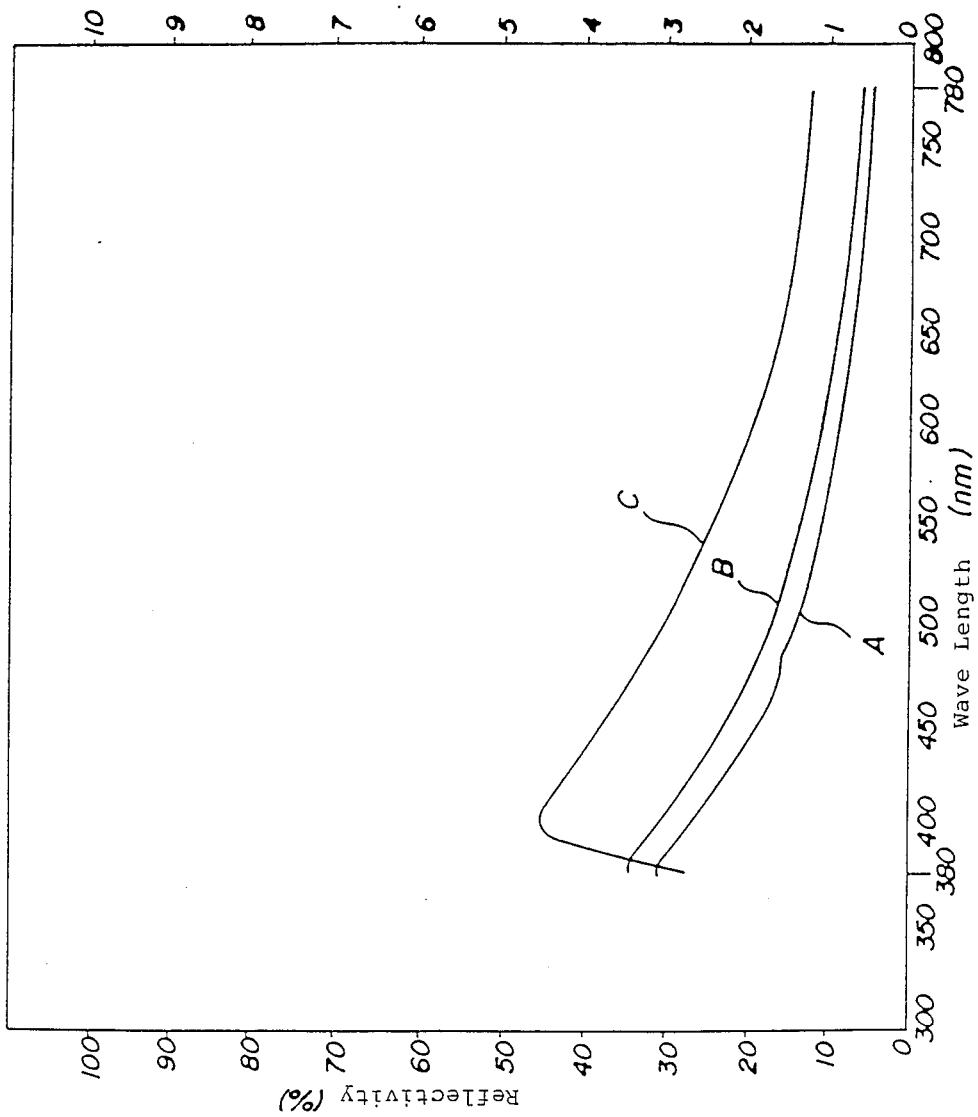
FIG. 50 is a graph showing the transmissivity of visible light in various Examples hereof.
Figure 51:
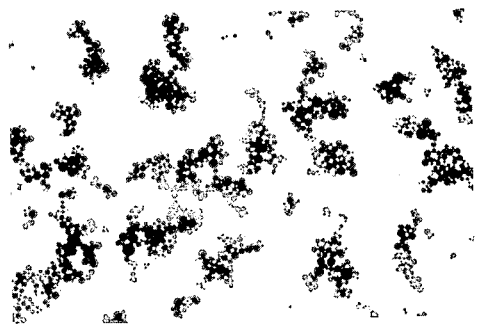
FIGS. 51 to 56 are each an electron microphotograph of the fine particles of titanium oxide used in various Examples hereof.
Figure 52:
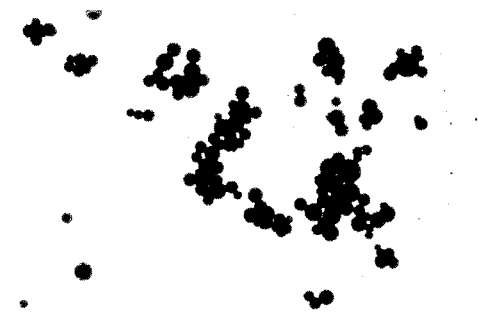
Figure 53:
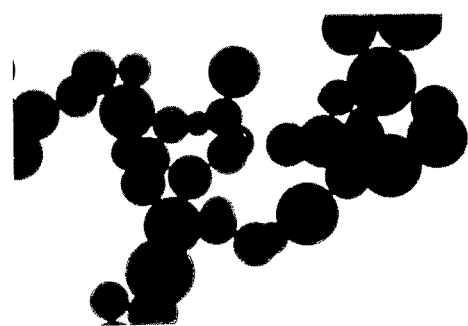
Figure 54:
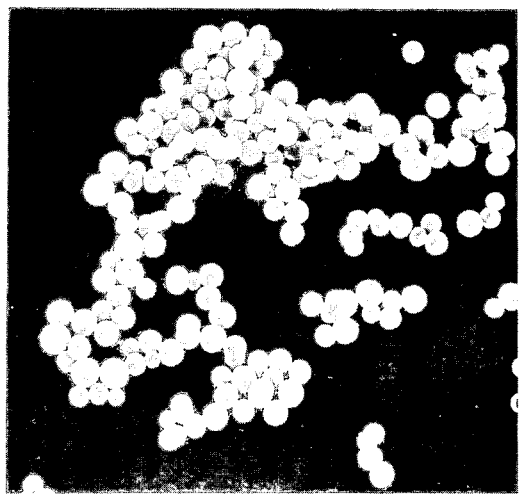
Figure 55:
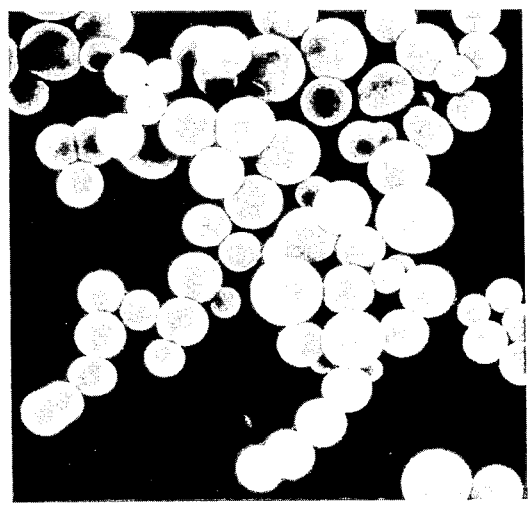
Figure 56:

FIG. 50 is a graph showing the transmissivity of visible light in Application Examples 8 and 9 and Reference Example 3, of which A, B and C show the results in Application Example 8, Application Example 9 and Reference Example 3, respectively.

Figure 57:
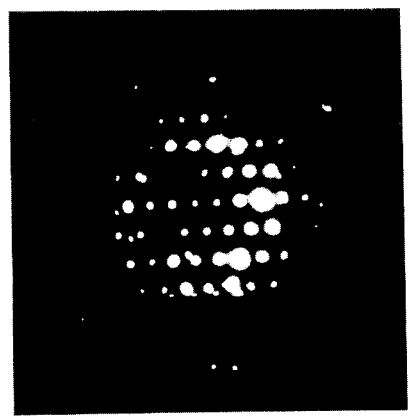
FIG. 57 is an electron diffraction pattern of the fine particles of titanium oxide in Reference Example 3.
Figure 58:
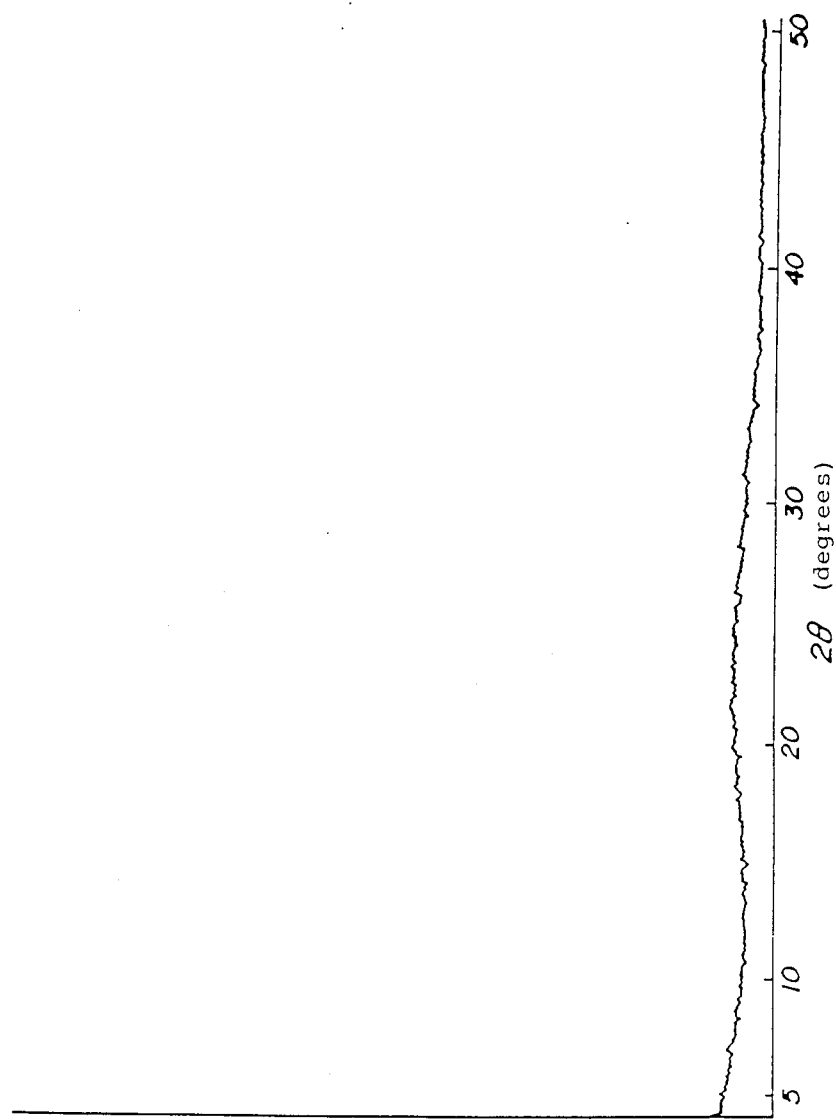
FIGS. 58 to 63 are each an X-ray diffraction diagram of the fine particles of titanium oxide used in various Examples hereof.
Figure 59:
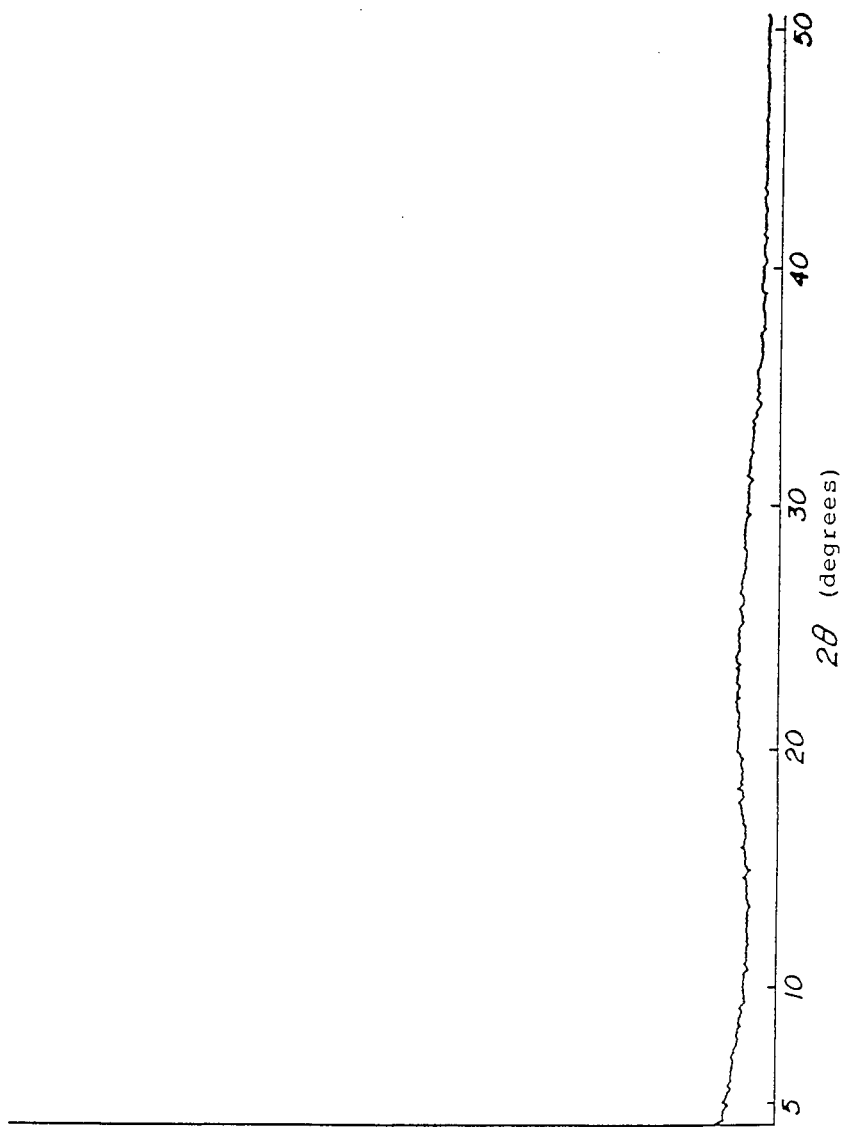
Figure 60:
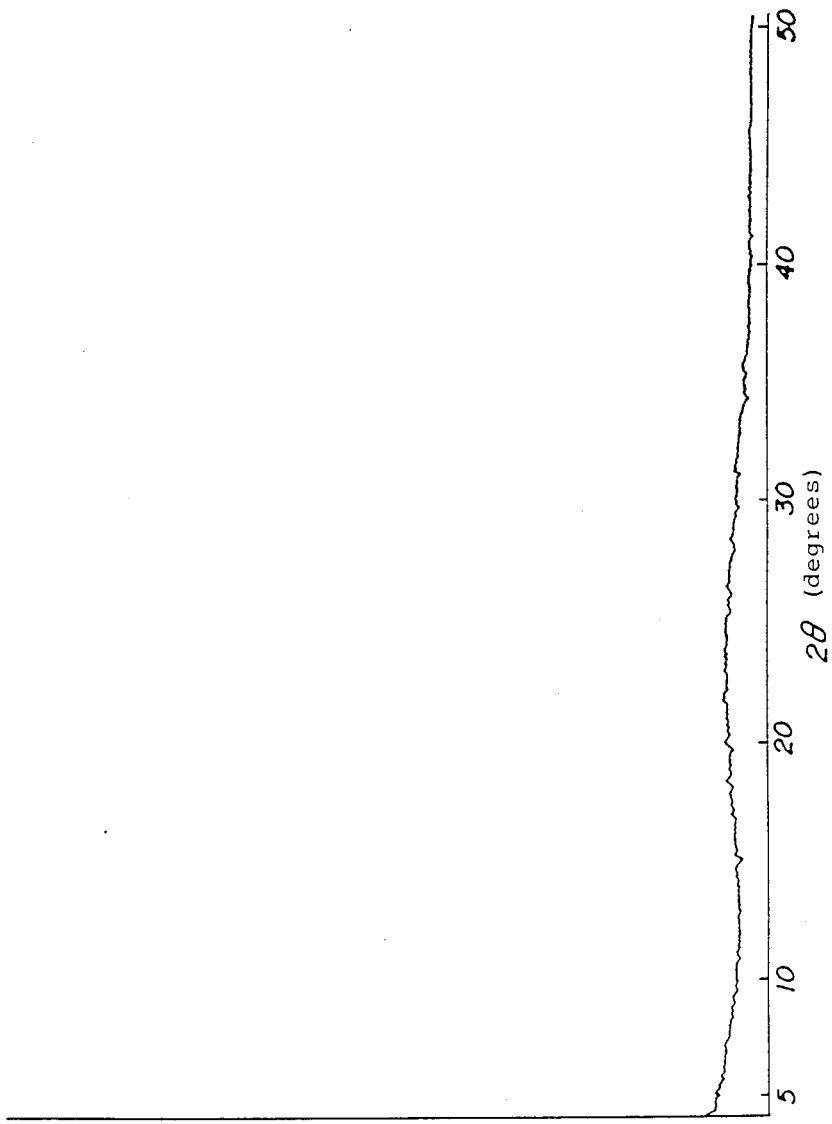
Figure 61:
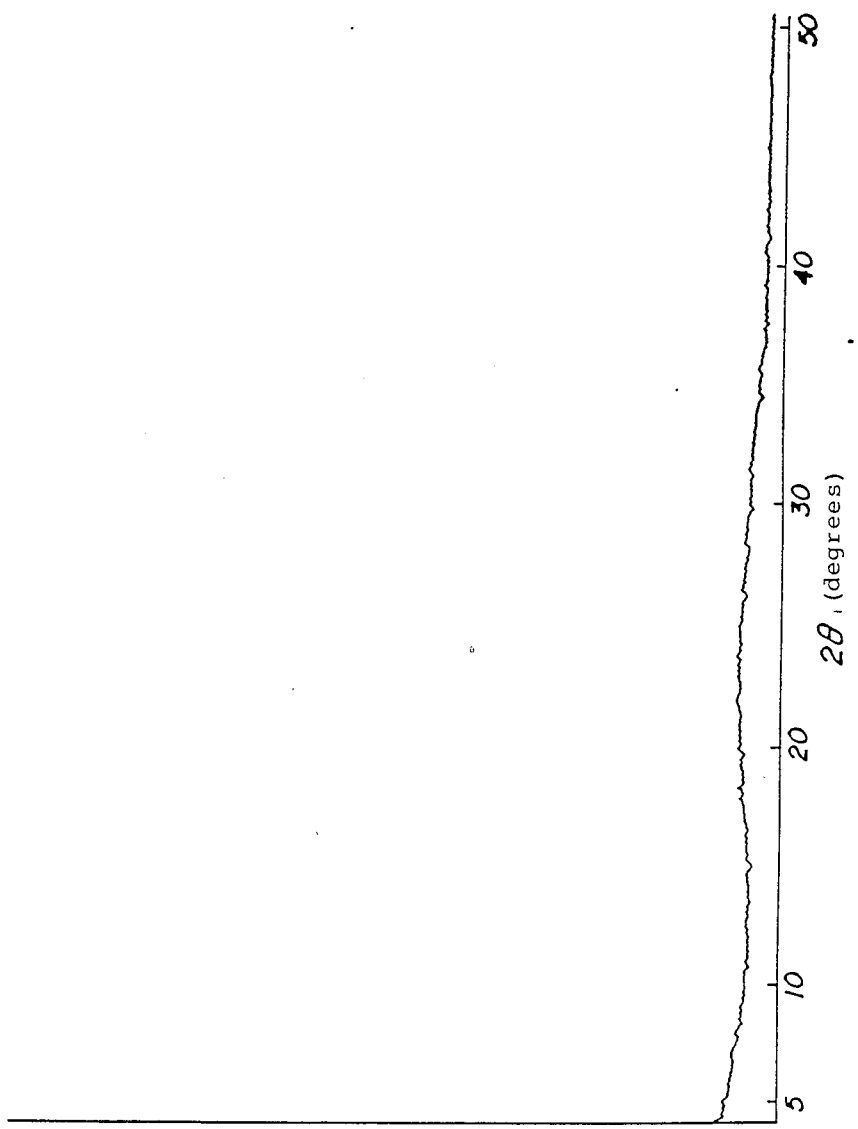
Figure 62:
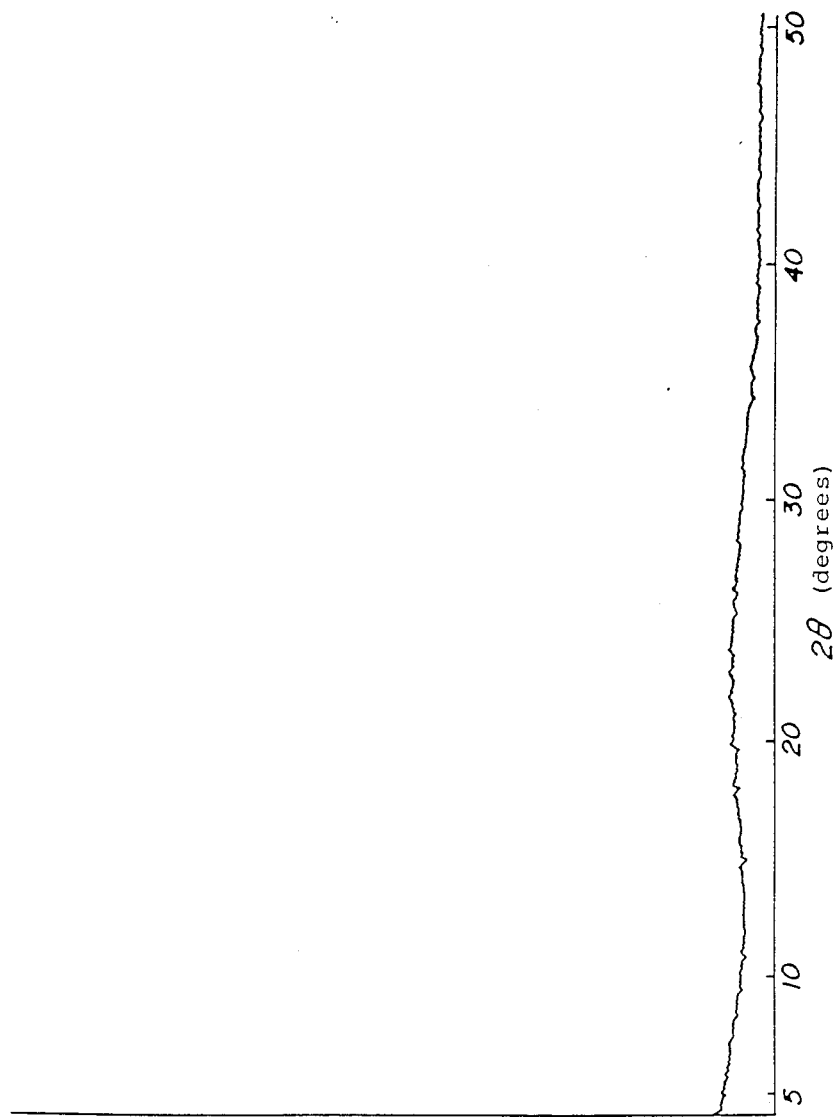
Figure 63:
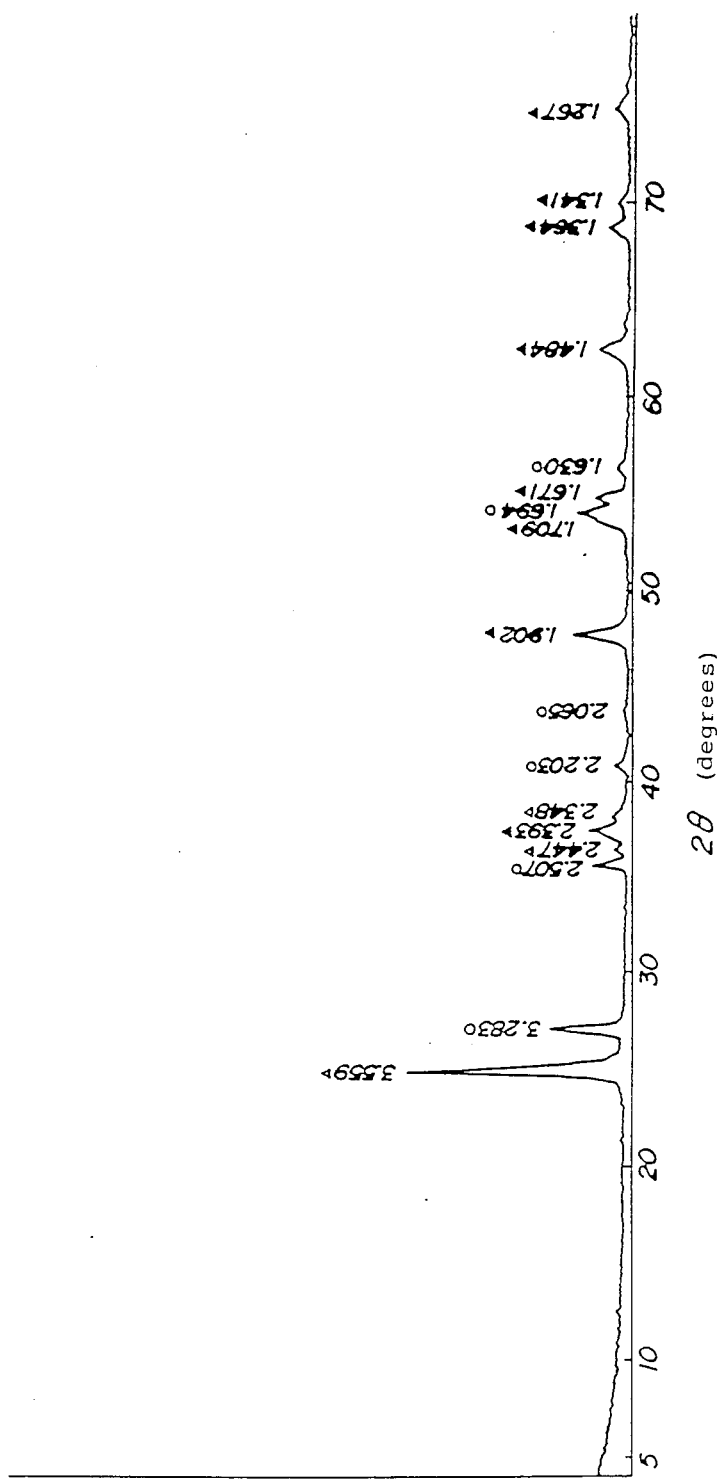

FIGS. 51 to 56 are each an electron microphotograph of the fine particles of titanium oxide used in Application Examples 8, 9, 10, 11 and 12 and Reference Example 3, respectively, FIG. 57 is an electron diffraction pattern of the fine particles of titanium oxide in Reference Example 3 and FIGS. 58 to 63 are each an X-ray diffraction diagram of the fine particles of titanium oxide used in Application Examples 8, 9, 10, 11 and 12 and Reference Example 3, respectively. In FIG. 63, the marks ○ indicate rutile-type titanium oxide and the marks △ indicate anatase-type titanium oxide.

Figure 64:
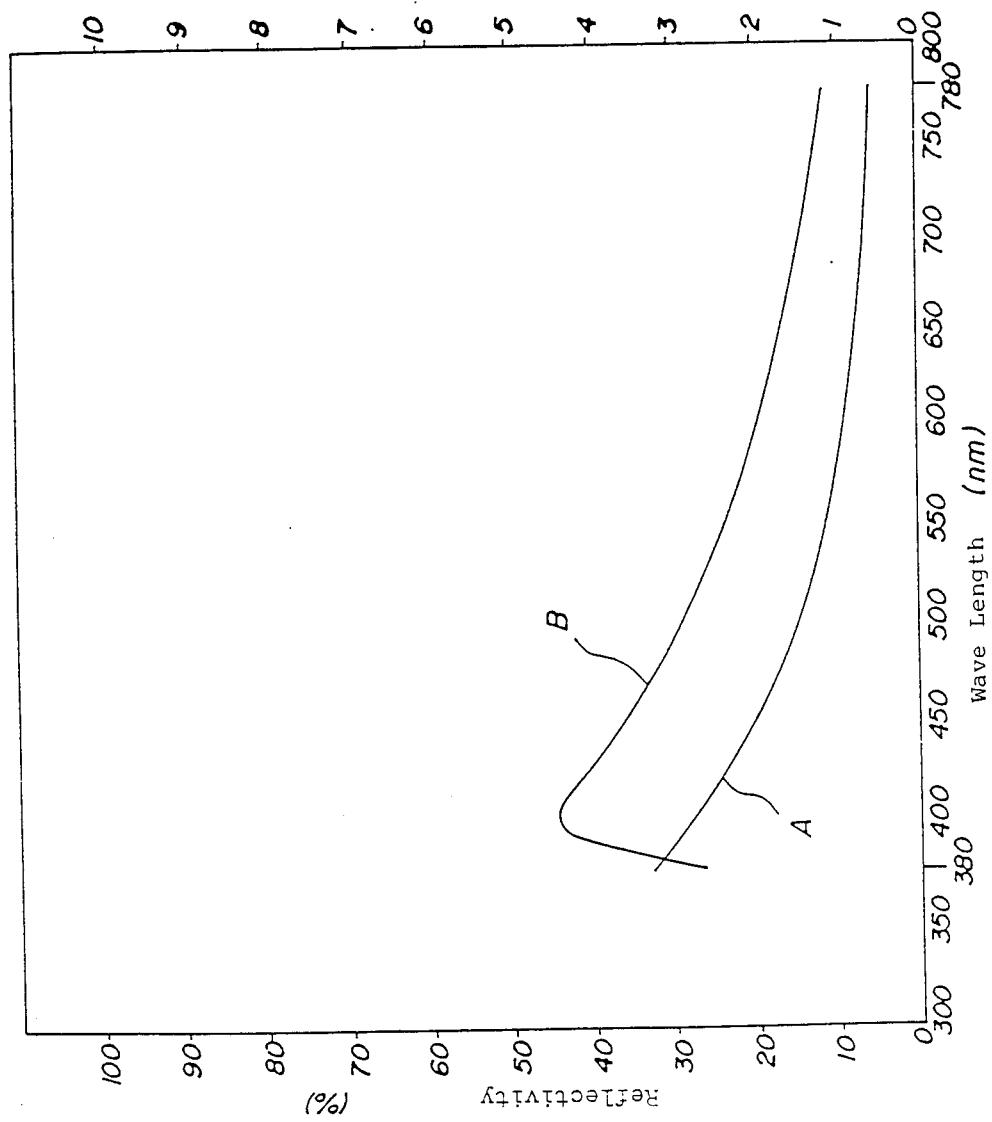
FIG. 64 is a graph showing the transmissivity of visible light in Example 13 hereof.

FIG. 64 is a graph showing the transmissivity of visible light in Application Example 13, in which A shows the results by use of the inventive titanium oxide (Example 14) and B shows the results by use of a comparative titanium oxide (trade name P-25).

Figure 65:
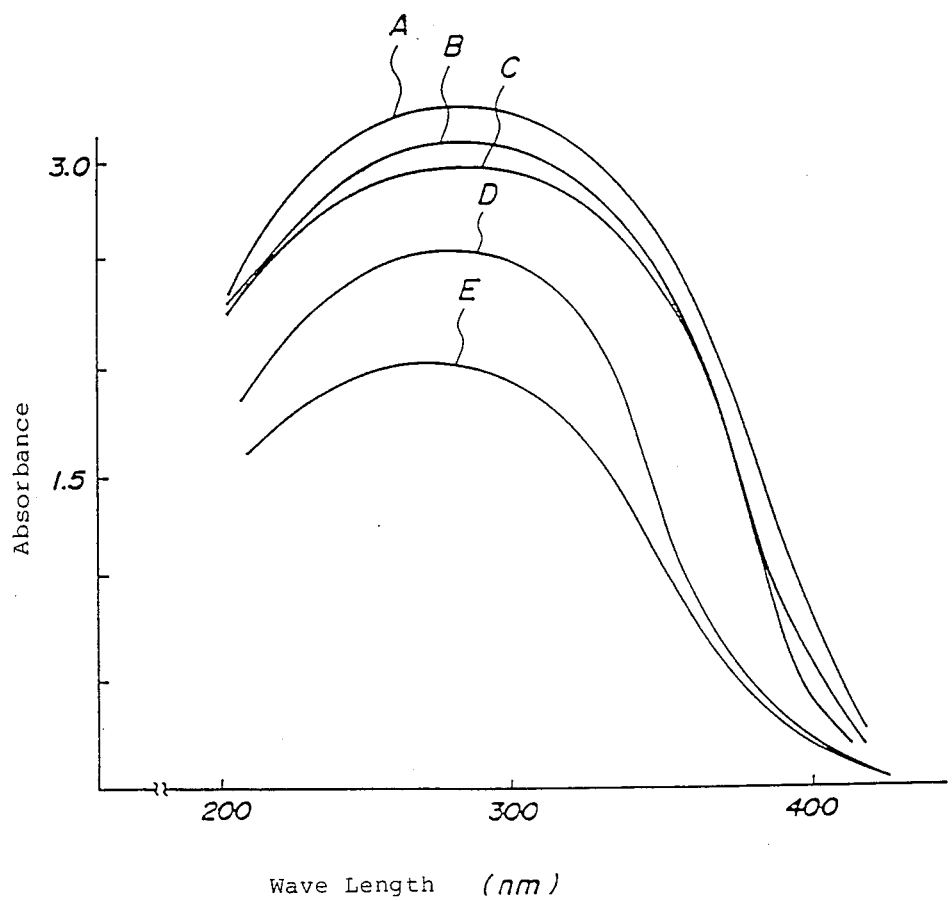
FIG. 65 gives the curves showing the absorbance by various kinds of titanium oxide samples in the wave length range from 200 to 400 nm.

FIG. 65 gives the curves showing the absorbance by various kinds of titanium oxide samples in the wave length range from 200 to 400 nm.

FIG. 66 is a graph showing the transmissivity of visible light in Application Examples 14 to 18, in which A, B and C show the results obtained by use of the titanium oxide samples of Example 8 and Example 24 and a comparative titanium oxide, respectively.

In the figures illustrating the apparatuses, 1 denotes an evaporator, 2 denotes a cooler, 3 denotes a reactor, 4 denotes an inner tube for cooling, 5 denotes a heater, 6 denotes a chemical pump, 7 denotes a vaporizer, 8 denotes glass wool, 9 denotes a cooling tube, 10 denotes a cooling chamber, 11 denotes a receiver vessel, 12 denotes a filter, 13 denotes a motor, 14 denotes the starting material, 15 denotes a heater and 16 denotes a thermometer.

DESCRIPTION OF THE PREFERRED EMBODIMENT

With an object to obtain an ideal metal oxide as described above, the present inventors have continued investigations on the mechanism for the formation of ultra-fine particles by a chemical reaction in the vapor phase. As a result, it has been determined that the particles growth in the method of chemical vapor-phase deposition proceeds by the incipient formation of homogeneous-phase nuclei owing to hydrolysis and/or thermal decomposition of the starting material and then by the formation of primary particles with several nuclei gathered together followed thereafter mainly by the coalescence of the primary particles. FIG. 1 is a schematic illustration of the mechanism for the formation and growth of particles.

It has been made clear from the above mentioned knowledge that the necessary conditions to obtain smaller particles include performing the decomposition reaction of the vaporized starting material at a velocity as high as possible at a reaction temperature as low as possible in order to prevent coalescence of the primary particles as produced along with decreasing the staying time of the particles in the reactor tube and rapid cooling of the atmospheric gas immediately after the reaction.

A variety of vaporizable metal compounds can be named as the starting material used in the method of the present invention.

There can be named, for example, titanium compounds having vaporizability such as titanium alkoxides, titanium halides and the like; zirconium compounds having vaporizability such as zirconium alkoxides, zirconium halides, organic zirconium compounds and the like; and alkoxides of rare earth metals such as scandium, yttrium, lanthanum, cerium, etc. and the like and they can be used either singly or as a combination of two kinds or more. When a titanium alkoxide is used as the vaporizable metal compound, for example, it is optional in order to increase the stability of the titanium oxide to be produced to admix other vaporizable metal compounds such as aluminum chloride, zirconium alkoxide, rare earth chloride, rare earth alkoxide and the like within a limit of concentration not to exceed 50% by moles of the titanium alkoxide.

Particular titanium alkoxides to be named here include, for example, titanium tetramethoxide, titanium tetraethoxide, titanium tetrapropoxide, titanium tetrabutoxide, diethoxy titanium oxide and the like.

Particular titanium halides to be named include titanium tetrachloride, titanium tetrabromide and other tetrahalogenated titanium compounds. Further, other titanium compounds having vaporizability can be used including trihalogeno monoalkoxy titanium, monohalogeno trialkoxy titanium, dihalogeno dialkoxy titanium and the like.

Particular zirconium alkoxides to be named include, for example, zirconium tetramethoxide, zirconium tetraethoxide, zirconium tetrapropoxide, zirconium tetrabutoxide and the like tetraalkoxy zirconiums.

Further, particular zirconium halides to be named include zirconium tetrachloride, zirconium tetrabromide and the like tetrahalogeno zirconiums and further trihalogeno monoalkoxy zirconiums, monohalogeno trialkoxy zirconiums, dihalogeno dialkoxy zirconiums and the like can also be used. In addition, vaporizable organic zirconium compounds such as zirconium phenoxide and the like can also be used.

In the method of the present invention, the above mentioned vaporizable metal compound is vaporized in the first place. The conditions for the gasification or vaporization of the vaporizable metal compound depend on the kind of the vaporizable metal compound and other factors and can hardly be given without ambiguity.

When a titanium alkoxide is used as the vaporizable metal compound, for example, the titanium alkoxide should preferably be vaporized at the boiling point or at a temperature slightly lower than the boiling point of the titanium alkoxide. This is because vaporization thereof at a temperature higher than the boiling point results in the decomposition of the titanium alkoxide proceeding under a condition without uniformity relative to the concentration of the compound so that the particles produced cannot be uniform in the specific surface area, particle diameter and other parameters.

In the vaporization of the above described vaporizable metal compound, it is preferable that the vaporizable metal compound is diluted into a proportion of 0.1 to 10% by volume with a diluent gas. This diluent gas serves as a carrier gas to introduce the gasified vaporizable metal compound into a decomposition furnace where the vaporizable metal compound is decomposed.

The diluent gas used here should be an inert gas such as argon, helium, nitrogen and the like, water vapor, oxygen or the like, of which helium, nitrogen and oxygen are preferable.

In practicing the method of the present invention, an oxygen-containing gas is required in the decomposition of the gasified vaporizable metal compound when it is not an oxygen-containing compound such as an alkoxide and the like. Accordingly, the preferable diluent gas used in the gasification thereof should be adequately selected taking the type of the vaporizable metal compound into consideration.

To describe the means for the gasification of the vaporizable metal compound by way of a more particular embodiment, for example, the vaporizable metal compound as the starting material is first heated by using an evaporator and the like and the diluent gas is introduced thereinto to be a gas containing the vaporizable metal compound which is introduced into the decomposition furnace described below.

Thereafter, the thus gasified vaporizable metal compound is decomposed by heating to be converted into ultra-fine particles of the metal oxide.

Namely, the vaporizable metal compound gasified in the above described manner is introduced into the decomposition furnace and the like by use of a carrier gas and subjected to decomposition in this decomposition furnace.

An oxygen-containing gas is required in order to perform the decomposition in this case when the vaporizable metal compound used as the starting material is not an oxygen-containing compound such as various kinds of alkoxides and the like. When the starting material used here is not an oxygen-containing compound such as various kinds of alkoxides and the like, it is preferable to use an oxygen-containing gas as the diluent gas as is mentioned before because another oxygen-containing gas need not be used additionally. The decomposition here implied should be construed to include not only the so-called ordinary thermal decomposition but also oxidation.

The temperature for the decomposition should preferably be 600° C. or below or, more preferably, in the range from 250° to 450° C. When the temperature is lower than above, no sufficiently high velocity of decomposition cannot be obtained while, at a temperature higher than 600° C., on the other hand, particles having a large specific surface area cannot be obtained due to coalescence taking place between the particles as formed.

The decomposition of the vaporizable metal compound should preferably be undertaken in the presence of water vapor in addition to the heating mentioned above. Suitable amount of the added water vapor is in the range from 30 to 120 times by moles of the vaporizable metal compound as the starting material. The decomposition reaction can proceed rapidly in the presence of such an excess amount of water vapor. As a result, the metal oxide to be produced would have a further decreased particle diameter.

Furthermore, the staying time of the vaporizable metal compound in the gasified state and the produced metal oxide in the decomposition furnace where the decomposition is performed should be short and the staying time should preferably be in the range from 0.1 to 10 seconds or, more preferably, from 0.1 to 5 seconds.

The decomposition furnace to perform the decomposition is not particularly limitative and any of conventionally used ones can be used although the furnace should preferably be provided with a cooling means in consideration of the cooling procedure described below. Further, it is preferable that fine particles of the metal oxide are deposited in advance on the walls of the decomposition furnace. The decomposition temperature can be greatly decreased by use of a decomposition furnace having walls on which fine particles of the metal oxide are deposited.

In this manner, particles of the metal oxide in a spherical and ultra-fine particulate form are produced while the ultra-fine particles as produced may be subject eventually to disadvantageous coalescence in the vapor phase.

In the method of the present invention, accordingly, the decomposition is immediately followed by cooling of the ultra-fine particles of the metal oxide as formed down to a temperature where coalescence thereof takes place no longer. Coalescence of the ultra-fine particles of the metal oxide can be prevented and growth of the particles can be suppressed by immediately quenching the ultra-fine particles of the metal oxide as formed in this manner.

Namely, coalescence of the particles of the metal oxide is prevented by this quenching so that the metal oxide in the spherical and ultra-fine particulate form as produced can be collected as such or as primary particles.

This procedure should be performed preferably as rapidly as possible. The cooling should be done to a temperature at which coalescence of the ultra-fine particles of the metal oxide as formed no longer takes place but the temperature depends on the cooling velocity and other factors so that it can hardly be given without indefiniteness. It is usually preferable that the temperature should be decreased down to a temperature of 100° C. or below within a length of time as short as possible. The means to effect cooling is not particularly limitative, for example, by use of air, water and the like. An effect identical to cooling can be obtained when a temperature difference is formed by, inversely, effecting localized heating partly by using an infra-red image furnace and the like.

The method of cooling is also not particularly limitative. For example, it is a possible way that the decomposition furnace is cooled from outside but cooling can be performed more efficiently within a short time by providing a cooling apparatus inside the decomposition furnace using air, water and the like as a cooling medium. It is further possible that the particles as formed are led out of the reaction system and cooled there after the reaction.

As is described above, the metal oxide in the ultra-fine particulate form can be obtained from which a final product can be prepared by separating and collecting after filtration using a membrane filter and the like.

When a cooling apparatus is provided inside the reaction system, it is also possible that the ultra-fine particles as formed are collected on this apparatus by utilizing thermal migration.

The method of the present invention can be performed also by use of the apparatus illustrated in FIG. 2. In this apparatus the vaporizable metal compound 14 is delivered to vaporizer 7 by motor (M) 13 driving chemical pump 6. In the vaporizer 7 the metal is soaked up by the heated glass wool 8 contained in the vaporizer 7 and heated by heater 5, to be converted into vapor. The vapor is carried by a carrier gas such as helium, nitrogen and the like and brought into the reactor 3 such as an infrared image furnace where it is subjected to decomposition such as the reaction, thermal decomposition, hydrolysis and the like and the product is immediately introduced into the cooling chamber 10 where it is quenched by contacting with a cooling medium such as helium and air and converted into ultra-fine particles which are further introduced into the receiver vessel 11 and filtered by the filter 12 to give the desired ultra-fine spherical particles of the metal oxide.

The metal oxide obtained according to the present invention has a very narrow distribution of particle diameter in the range from 5 to 50 nm and is spherical having an average particle diameter of 40 nm or smaller. This metal oxide has a very large specific surface area of $5 \times 10^4$ to $30 \times 10^4$ m$^2$/kg as determined by the BET method.

When the metal oxide is titanium oxide, the oxide can be amorphous in addition to the crystalline forms of rutile, anatase and mixtures thereof including mixtures of amorphous and crystalline ones. Such a spherical body of amorphous titanium oxide is a novel product firstly obtained by the present invention. The amorphous titanium oxide here implied includes those of which the peak area of the titanium oxide in the X-ray diffraction is 5% or smaller of the peak area of a rutile or anatase type titanium oxide of a standard reagent grade under the same conditions of measurement.

In the next place, a description is given of the case in which a metal oxide or, in particular, titanium oxide according to the present invention is used in cosmetics.

Titanium oxide has excellent effect of ultraviolet shielding so that it is hitherto used as a constituent of cosmetics. The titanium oxide conventionally used, however, is a crystalline one, i.e., rutile, anatase or a mixture thereof, and, in addition, the forms thereof are cubic, rhombic, scaly, needle-like and the like and not spherical. Accordingly, such a titanium oxide has defective points that the dispersibility and stability in the base material of cosmetics are insufficient and the usability thereof is poor in respect of spreadability, adherence, natural finish and the like.

When the titanium oxide according to the present invention is used, all of the above described problems are solved altogether.

When used in cosmetic products, the amount of compounded titanium oxide should be in the range from 0.01 to 50% by weight or, preferably, from 0.05 to 20% by weight.

In the following, the present invention is described by way of examples.

EXAMPLE 1

Manufacture of metal oxide particles was conducted by using the apparatus illustrated in FIG. 3. That is, zirconium tetraisopropoxide as the starting material was heated and vaporized at a temperature of 240° C. by use of the evaporator 1 and helium gas was bubbled into this evaporator 1 at a rate of 600 cm$^3$/minute. This operation served to generate a helium gas containing 0.08% by moles of zirconium tetraisopropoxide which was introduced into the reactor 3 equipped with a cooler 2 (inner diameter of the reactor: 4.0 cm; outer diameter of the inner tube 4 for cooling: 2.3 cm; distance from the inlet of the reactor to the heater 5:3 cm; and length of the heater 5:20 cm). This reactor 3 was heated at a temperature of 400° C. by means of the heater 5 to perform the thermal decomposition. The particles of zirconium oxide produced by the thermal decomposition were brought into contact with the cooler under flow of air at room temperature by means of the cooler 2 and immediately cooled down to a temperature of 150° C. or below. This cooler 2 was disposed along the center line of the reactor 3 to form a structure of duplex tube and cooling was performed by introducing cooling air into this tube.

Figure 4:
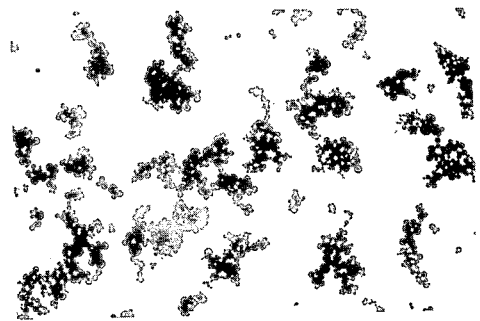
FIG. 4 is an electron microphotograph of 50,000 magnification showing the particulate structure of the fine particles of zirconium oxide obtained in Example 1.
Figure 5:
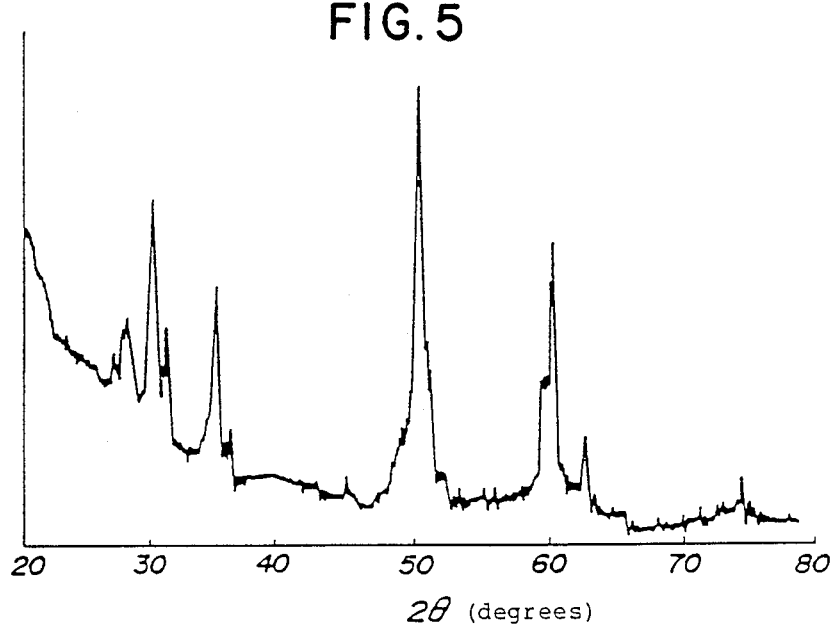
FIG. 5 is an X-ray diffraction diagram of the fine particles of FIG. 4.

After termination of the reaction, the particles deposited on the outer walls of the cooler 2 were taken out and subjected to the measurement of the properties thereof. The thus obtained particles of zirconium oxide were very uniform ultra-fine particles of zirconium oxide, i.e. zirconia, having a specific surface area of 180 m$^2$/g, average particle diameter of 30 nm and particle diameter distribution in the range from 20 to 60 nm. An electron microphotograph of this material is shown in FIG. 4. Meanwhile, it was found that this material had a purity of 98% as ZrO$_2$ by the X-ray diffractometric analysis and plasma emission spectrophotometric analysis. FIG. 5 shows the X-ray diffraction diagram obtained in this measurement. The X-ray diffractometry in this case and hereinbelow was carried out by using the Cu Kα line.

COMPARATIVE EXAMPLE 1

Figure 6:
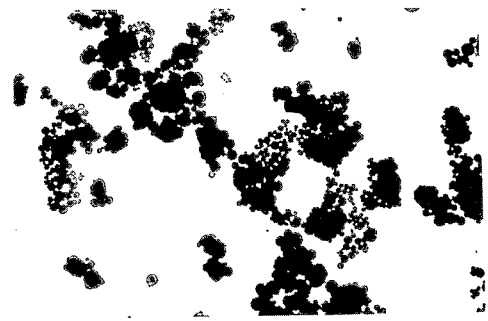
FIG. 6 is an electron microphotograph of 10,000 magnification showing the particulate structure of the fine particles of zirconium oxide obtained in Comparative Example 1.

The procedure was the same as in Example 1 excepting omission of the cooling after the thermal decomposition. The particles of zirconium oxide obtained by passing through the filter 6 had an average particle diameter of about 300 nm and the particle diameter distribution ranged broadly in the range from 20 to 500 nm showing very low uniformity of the particle diameter. FIG. 6 shows an electron microphotograph of this product.

EXAMPLE 2

Figure 7:
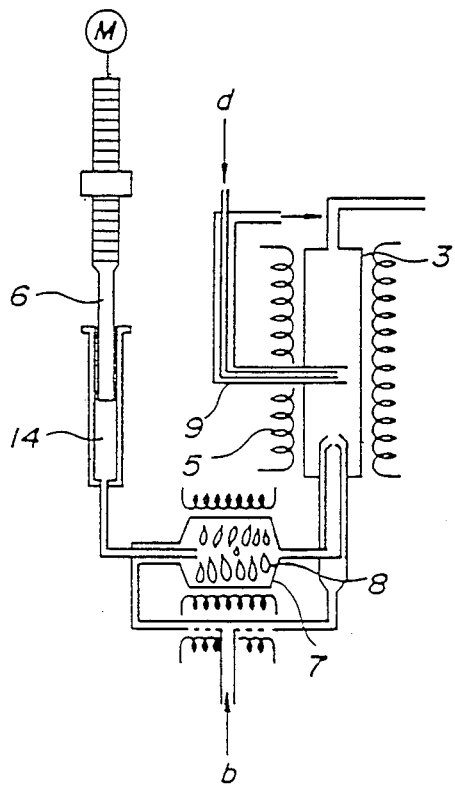
FIG. 7 is a schematic illustration of further embodiment of the apparatus used in the inventive method.
Figure 8:
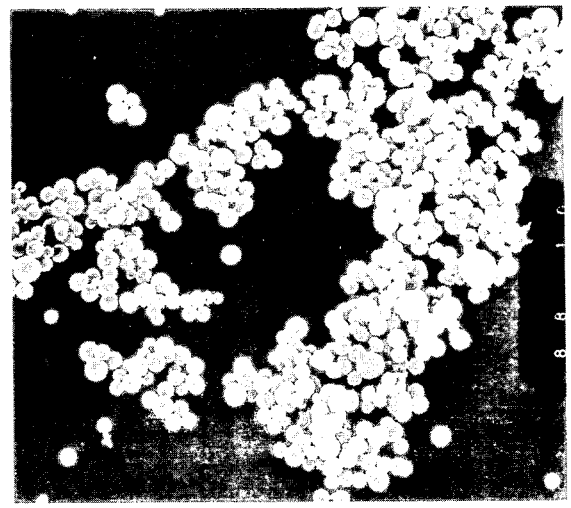
FIG. 8 is an electron microphotograph of 30,000 magnification showing the particulate structure of the fine particles of titanium oxide obtained in Example 2.

Metal oxide particles were manufactured by using the apparatus illustrated in FIG. 7. Thus, titanium tetraisopropoxide Ti(OC$_3$H$_8$)$_4$ was soaked by very small bits by the glass wool 8 in the vaporizer 7 heated at 200° C. by means of the chemical pump 6 and vaporized there to be introduced by use of helium gas as the carrier gas into the reactor 3 having an inner diameter of 30 mm and provided on the inner walls with fine particles of titanium oxide deposited thereon in advance and thermally decomposed at 350° C. to give a product. A cooling tube 9 for water-cooling was inserted into this reactor 3 so that the above mentioned product was immediately cooled and deposited on the surface of the cooling tube 9 in the form of ultra-fine particles of titanium oxide. The ultra-fine particles of titanium oxide were collected and subjected to the measurement of the properties. The electron microphotograph indicated that the average particle diameter of the ultra-fine particles was 20 nm and the particle diameter distribution ranged from 10 to 100 nm. Further, the specific surface area as determined by the BET method was 320 m$^2$/g and the X-ray diffractometric analysis indicated that they were amorphous in respect of the crystalline structure. The true density of the ultra-fine particles was 2.4 g/cm$^3$ at 23° C. or 2.9 g/cm$^3$ after drying at 115° C. for 4 hours as determined by the helium gas substitution method using a pentapycnometer manufactured by Quantasorb Co. FIG. 8 shows an electron microphotograph of this product.

COMPARATIVE EXAMPLE 2

Figure 9:
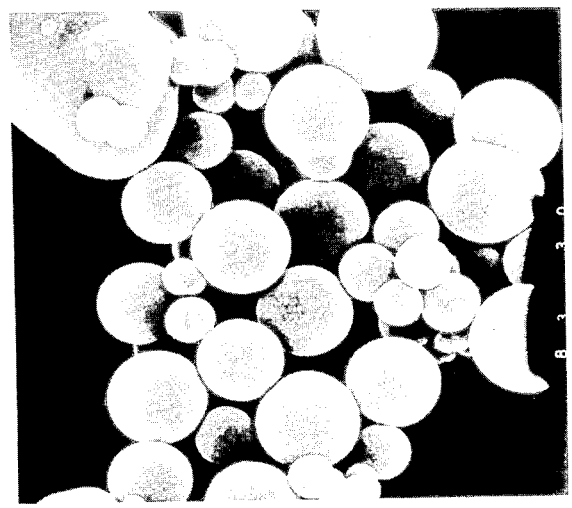
FIG. 9 is an electron microphotograph of 30,000 magnification showing the particulate structure of the fine particles of titanium oxide obtained in Comparative Example 2.

The procedure was the same as in Example 2 excepting omission of the cooling with the cooling tube. The thus obtained fine particles of titanium oxide had an average particle diameter of 300 nm, particle diameter distribution in the range from 30 to 600 nm and specific surface area of 90 m$^2$/g and the crystalline structure thereof was amorphous. FIG. 9 shows an electron microphotograph of the fine particles of this titanium oxide.

EXAMPLE 3

Figure 11:
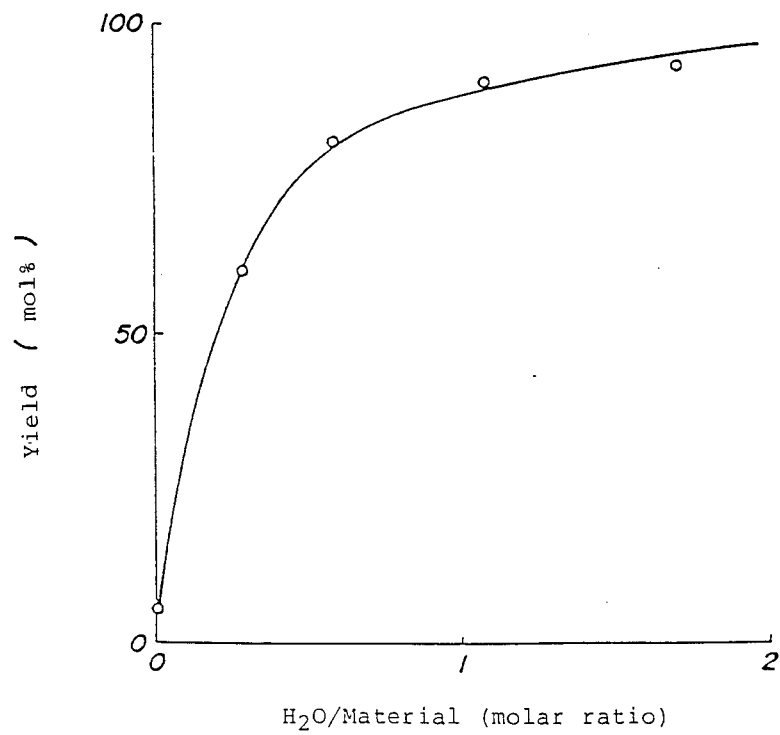
FIG. 11 is a graph showing the relationship between the molar ratio of water to the starting material and the yield in Example 3 of the present invention.
Figure 12:
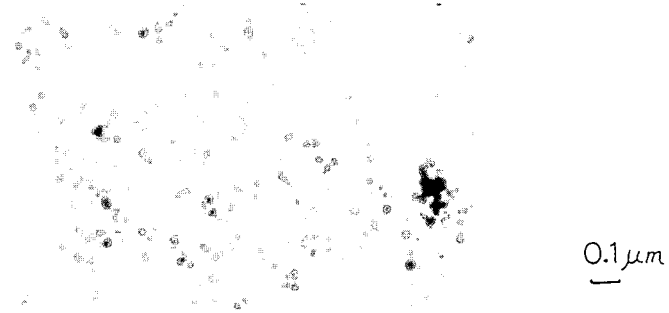
FIG. 12 is an electron microphotograph showing the particulate structure by the TEM image of the fine particles of titanium oxide obtained in Example 3 hereof.
Figure 10:
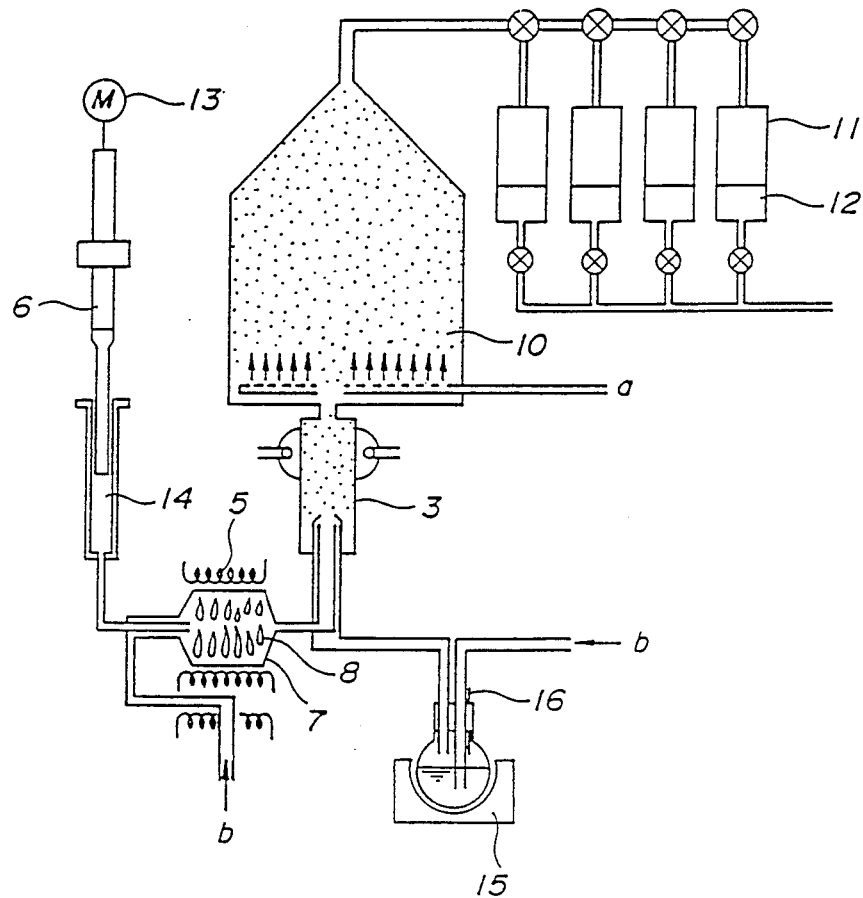
FIG. 10 is a schematic illustration of an embodiment of the apparatus used in Examples 3 to 5 hereof.

Metal oxide particles were manufactured by use of the apparatus illustrated in FIG. 10. The water vapor introduced into the reaction system was obtained by bubbling dry air at a rate of 10 liters/minute into water heated by the heater 15 at 200° C. The thermometer 16 shown in FIG. 10 indicated a temperature of about 50° C. This procedure served to produce air containing 0.1% by moles of water. Titanium tetraisopropoxide Ti(OC$_3$H$_7$)$_4$ as the starting material was soaked by very small bits by the glass wool 8 in the vaporizer 7 heated at 200° C. by means of the chemical pump 6 and vaporized there. The air used as the carrier gas was impregnated with 0.06% by moles of titanium tetraisopropoxide. The air was introduced into the rector 3 having an inner diameter of 55 mm and a length of 100 mm together with the air containing 0.1% by moles of water and reacted at 300° C. to give a product. Table 1 shows the yield of the thus obtained product in % on the TiO$_2$ base and the properties and the results of chemical analysis thereof. FIG. 11 shows the yield as a function of the molar ratio of water and the starting material. FIG. 12 shows an electron microphotograph of the thus obtained product.

Figure 18:
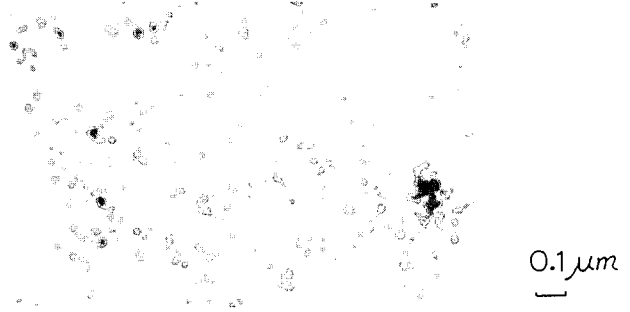
FIG. 18 is an electron microphotograph showing the particulate structure by the TEM image of the fine particles of titanium oxide obtained in Example 7 hereof.

In the chemical analysis, titanium was quantitatively determined by the fusion of the sample with potassium pyrosulfate followed by the induction-coupling plasma method. Carbon and hydrogen were determined by use of the CHN coder (Model MT-Z, manufacture by Yanagimoto Seisakusho) after decomposition of the sample at 850° C. Oxygen was determined by use of an oxygen microanalyzer (manufactured by Mitamura Riken Kogyo Co.) after decomposition of the sample at 940° C. The results for oxygen do not include the oxygen contained in the titanium oxide per se.

material in the same procedure as in Examples 2, 3 and 6 which was introduced into the reactor 3 having an inner diameter of 55 mm and a length of 100 mm and reacted at 300° C. to give a product. Table 1 shows the yield, properties and results of chemical analysis of the product. FIG. 18 shows an electron microphotograph of the thus obtained product.

TABLE 1

Figure 13:
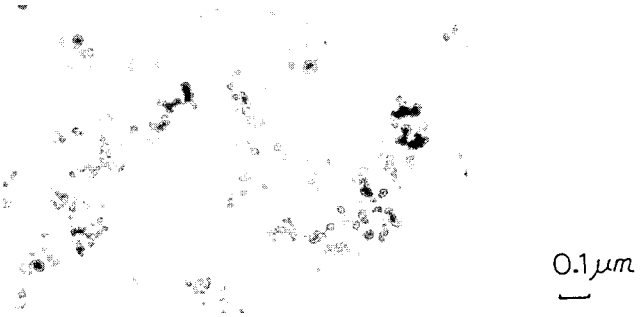
FIG. 13 is an electron microphotograph showing the particular structure by the TEM image of the fine particles of titanium oxide obtained in Example 4 hereof.
Figure 14:
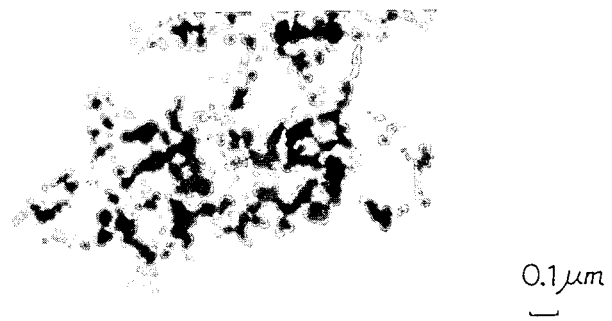
FIG. 14 is an electron microphotograph showing the particulate structure by the TEM image of the fine particles of titanium oxide obtained in Example 5 hereof.
Figure 16:
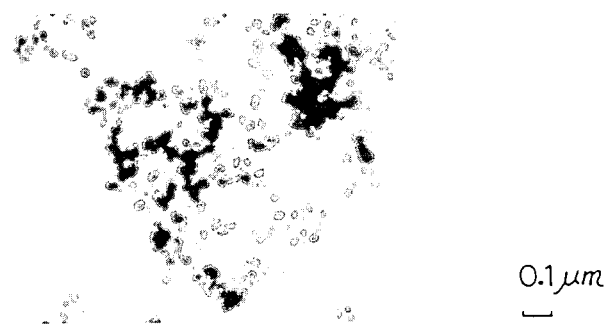
FIG. 16 is an electron microphotograph showing the particulate structure by the TEM image of the fine particles of titanium oxide obtained in Example 6 hereof.

|  |  | Example | | | | |
|---|---|---|---|---|---|---|
|  |  | 3 | 4 | 5 | 6 | 7 |
| Yield (% by moles) | | 95 | 6 | 90 | 90 | 85 |
| Specific surface area (m²/g) | | 120 | 130 | 168 | 153 | 170 |
| TEM image | | FIG. 12 | FIG. 13 | FIG. 14 | FIG. 16 | FIG. 18 |
| Particle diameter (μm) | | 0.02 | 0.02 | 0.02—0.03 | 0.02—0.03 | 0.02—0.03 |
| Crystalline structure | | Amorphous | Amorphous | Amorphous | Amorphous | Amorphous |
| Value of composition (% by weight) | Ti | 47 | 46 | 48 | 48 | 49 |
| | C | 1.0 | 3.3 | 1.0 | 1.0 | 0.6 |
| | H | 1.5 | 2.6 | 1.2 | 1.6 | 1.8 |
| | O | 11.1 | 14.3 | 11.9 | 12.0 | 15.5 |

EXAMPLE 4

The procedure was just the same as in Example 3 except that no water was contained in the air. Table 1 also shows the yield, properties and results of chemical analysis of the thus obtained product. FIG. 13 shows an electron microphotograph of the thus obtained product.

EXAMPLE 5

The procedure was the same as in Example 3 except that the temperature of the reactor 3 was decreased to 150° C. The yield, properties and results of chemical analysis of the thus obtained product are shown in Table 1. FIG. 14 shows an electron microphotograph of the thus obtained product.

EXAMPLE 6

Figure 15:
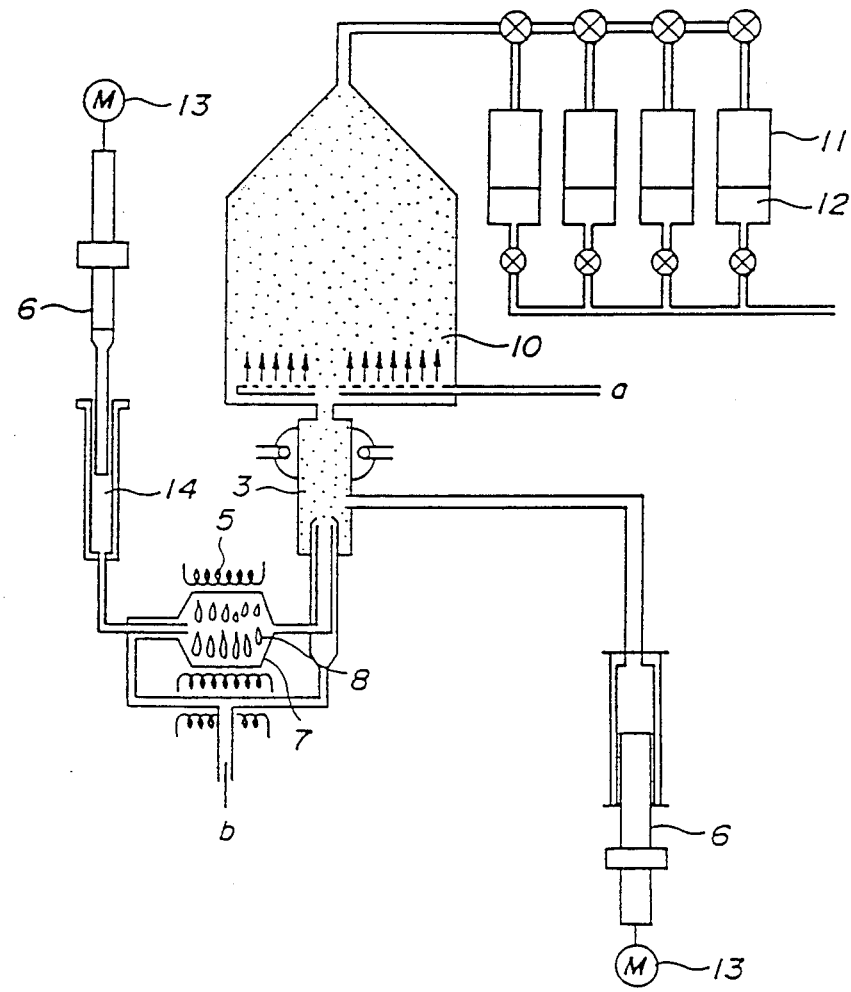
FIG. 15 is a schematic illustration of an embodiment of the apparatus used in Example 6 of the present invention.

Metal oxide particles were manufactured by use of the apparatus for reaction illustrated in FIG. 15. As the water vapor to be introduced into the reactor, the carrier gas was impregnated with 0.05% by moles of water after evaporation of water introduced by very small bits to the vicinity of the nozzle in the reactor 3. The tetraisopropoxide Ti(OC$_3$H$_7$)$_4$ as the starting material was soaked by very small bits by the glass wool 8 in the vaporizer 7 heated at 200° C. by means of the chemical pump 6 and vaporized there and air used as the carrier gas was impregnated with 0.06% by moles of the titanium isopropoxide. The air was introduced into the reactor 3 having an inner diameter of 55 mm and a length of 100 mm and reacted at 300° C. to give a product.

Table 1 shows the yield, properties and results of chemical analysis of the thus obtained product. FIG. 16 shows an electron microphotograph of the thus obtained product.

EXAMPLE 7

Figure 17:
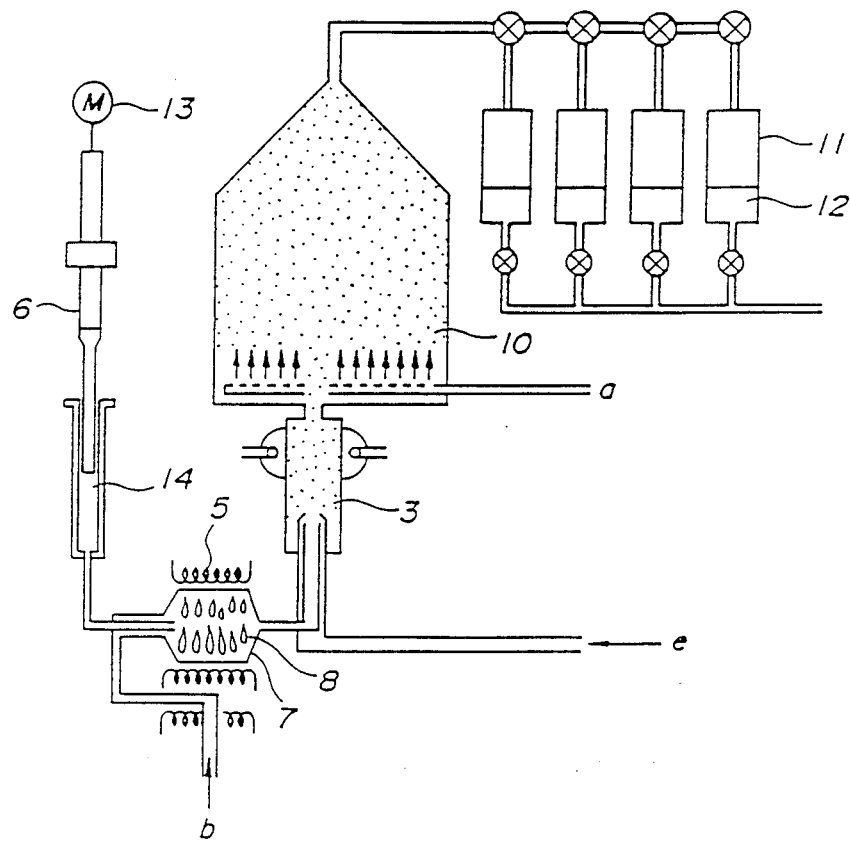
FIG. 17 is a schematic illustration of an embodiment of the apparatus used in Example 7 hereof.

Metal oxide particles were manufactured by use of the apparatus for reaction illustrated in FIG. 17. Introduction of water vapor was performed by use of high-temperature steam as the heat source. It also served as the carrier gas. The steam used here was at 300° C. Air was impregnated with 0.06% by moles of the starting

EXAMPLES 8 to 11

Figure 19:
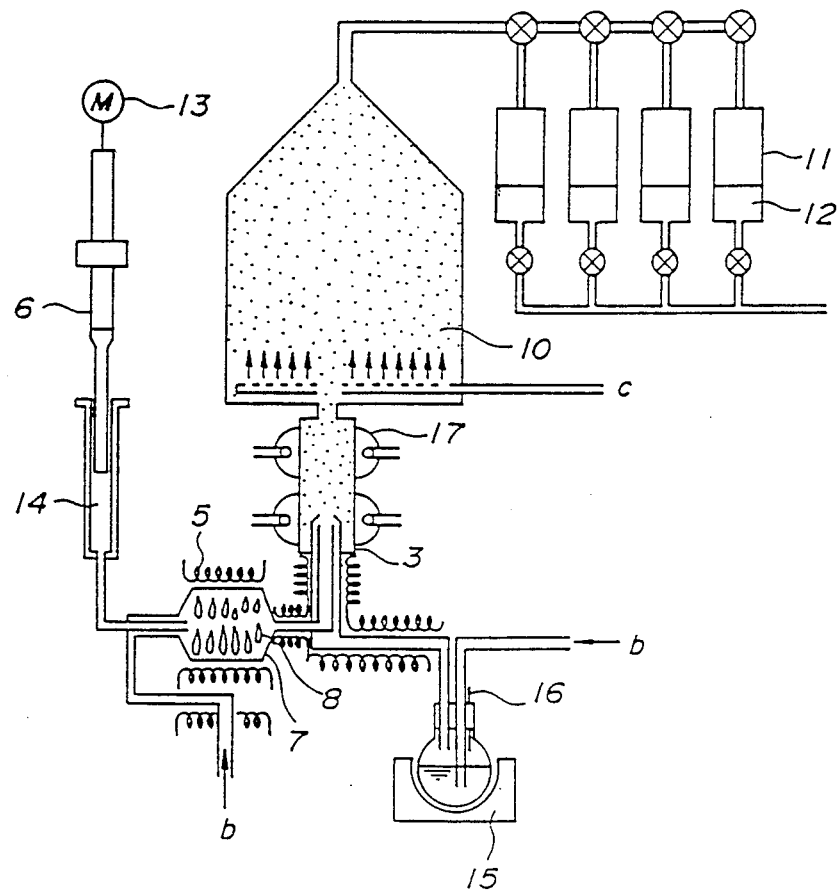
FIG. 19 is a schematic illustration of an embodiment of the apparatus used in Examples 8 to 11 hereof.

Particles of titanium oxide were manufactured by use of the apparatus for reaction illustrated in FIG. 19. Water vapor was introduced into the reaction system by heating the water in the steam generator with the oil bath heater 15 and passing N$_2$ gas there at a flow rate of 10 liters/minute.

This operation served to prepare N$_2$ gas containing water vapor in a definite concentration which was introduced into the reactor tube. The content of water vapor in the N$_2$ gas was performed by controlling the temperature of water in the steam generator. Namely, the concentration of water vapor in the N$_2$ gas was 3.6, 7.6, 13 or 26% by moles when the temperature of water was 30° C., 50° C., or 70° C. or 90° C., respectively.

Titanium tetraisopropoxide as the starting material was soaked by very small bits by the glass wool 8 in the vaporizer 7 heated at 230° C. by means of the chemical pump 6 and vaporized. N$_2$ as the carrier gas was passed at a rate of 10 liters/minute to contain 0.12% by moles of titanium tetraisopropoxide and introduced into the reactor 3 having an inner diameter of 55 mm and length of 100 mm where it was brought into contact in a dynamic flow with N$_2$ gas containing water vapor and reacted at 300° C. to give a product. In the contacting gaseous phase of the N$_2$ gas containing the starting material and the N$_2$ gas containing water vapor, in this case, the molar ratio of water vapor to the starting material H$_2$O/Ti(OC$_3$H$_7$)$_4$ was 30, 55, 120 or 220, respectively. And, the staying time of the particles was 0.3 second.

Figure 20:
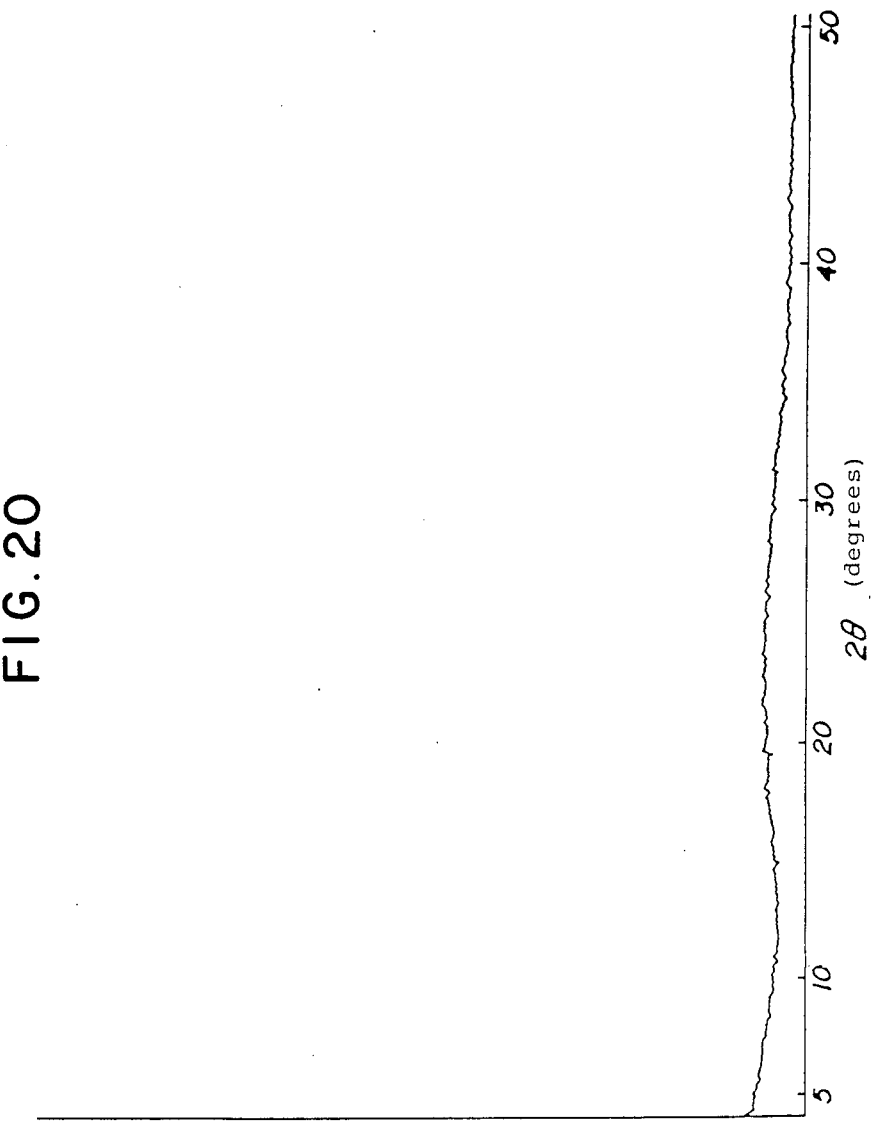
FIG. 20 is an X-ray diffraction diagram of the fine particles of titanium oxide obtained in Example 8.

After the reaction, the formed particles were immediately introduced into the cooling chamber 10 under a flow of cooling air to be cooled to 30° C. and deposited on the filter 12 of the receiver vessel 11. These conditions and the properties of the thus obtained products are shown in Table 2. Further, the crystalline structure was identified by the X-ray diffractometry and the X-ray diffraction diagram of the product obtained in Example 8 is shown in FIG. 20.

COMPARATIVE EXAMPLE 3

The same procedure was undertaken as in Example 8 except that no water vapor was added and the reaction temperature was 350° C. The results are shown in Table 2.

COMPARATIVE EXAMPLE 4

The same procedure as in Example 8 was undertaken except that the temperature in the steam generator was 5° C. The results are shown in Table 2. The rate of water consumption in this case was about 2 g per hour corresponding to a concentration of 0.6% by moles in the $N_2$ gas and a molar ratio of about 5 to the starting material in the field of the reaction.

EXAMPLES 12 to 16

The same procedure as in Example 8 was undertaken except that the flow rate of the $N_2$ gas as the carrier gas in Example 8 was varied so that the staying time of the particles in the reactor tube was 0.1, 0.6, 1.0, 2.0 or 4.0 seconds.

The thus obtained ultra-fine particles of titanium oxide were amorphous in the crystalline structure as is typically shown in FIG. 20. The true density of this titanium oxide was 2.9 to 3.2 g/cm$^3$ as determined by use of a pentapycnometer manufactured by Quantasorb Co. The results are shown in Table 2.

COMPARATIVE EXAMPLE 5

The same procedure as in Example 8 was undertaken except that the staying time of the particles in the reactor tube in Example 8 was 10 seconds. The results are shown in Table 2.

COMPARATIVE EXAMPLE 6

The same procedure as in Example 8 was undertaken except that absolutely no cooling air was passed through the receiver vessel 10 in Example 8 not to perform cooling. The results are shown in Table 2.

EXAMPLE 17

Figure 44:
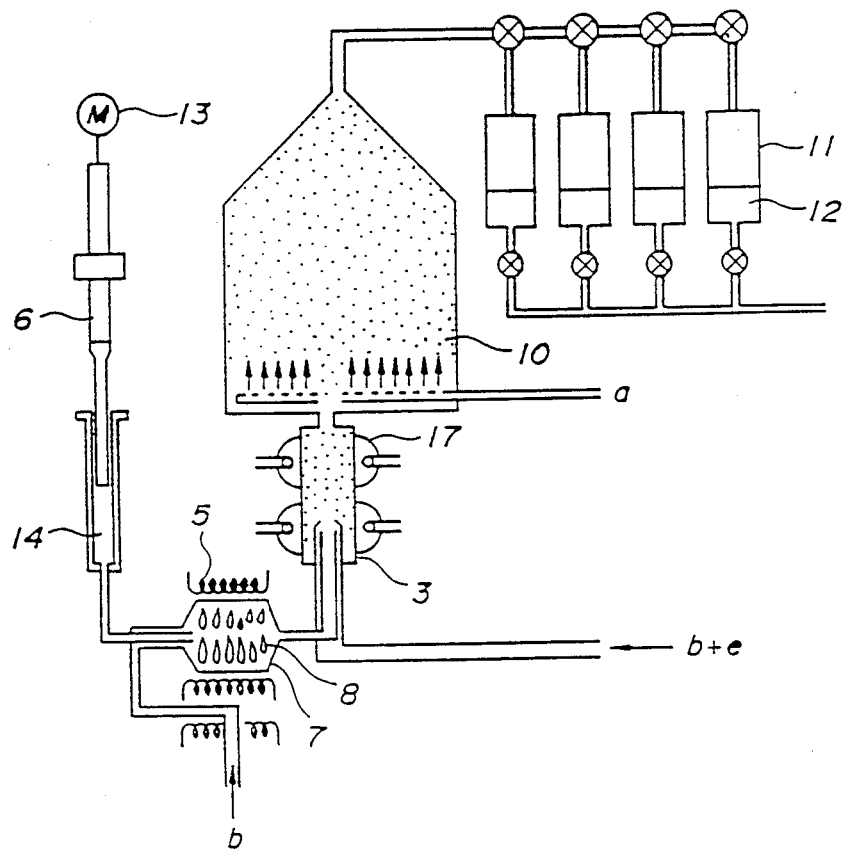
FIG. 44 is a schematic illustration of an embodiment of the apparatus used in Example 17 hereof.

The apparatus illustrated in FIG. 44 was used in which steam at 350° C. was used as the heat source and as the water vapor of addition. A product was obtained with other conditions identical to those in Example 11.

This product was an amorphous titanium oxide in a spherical form having a particle diameter distribution in the range from 10 to 30 nm and an average particle diameter of 25 nm. The properties of this product are shown in Table 2.

EXAMPLE 18

Particles of titanium oxide were manufactured by use of the apparatus illustrated in FIG. 7. That is, Ti(OC$_3$H$_7$)$_4$ as the starting material was soaked by very small bits by the glass wool 8 in the vaporizer 7 heated at 230° C. by means of the chemical pump 6 to be vaporized and introduced by use of helium gas as the carrier gas into the reactor 3 having an inner diameter of 30 mm and provided in advance with fine particles of titanium oxide deposited on the inner walls where it was thermally decomposed at 450° C. to give a product. The above mentioned product was immediately cooled by means of cooling tube 9 which was equipped in the reactor 3 and deposited on the surface of the cooling tube 9 in the form of ultra-fine particles of titanium oxide. The ultra-fine particles of titanium oxide were collected and subjected to the measurement of properties. It was found from an electron microphotograph that the ultra-fine particles had an average particle diameter of 20 nm and a particle diameter distribution in the range from 10 to 50 nm. Further, it was found that the specific surface area was 320 m$^2$/g as determined by the BET method and the crystalline structure was a mixed phase of amorphous phase and anatase phase according to the X-ray diffractometric analysis. Further, the true density of the ultra-fine particles was found to be 3.4 g/cm$^3$ as a result of the measurement by the He gas substitution method using a pentapycnometer (manufactured by Quantasorb Co.). The values of these properties are shown in Table 2.

Figure 45:
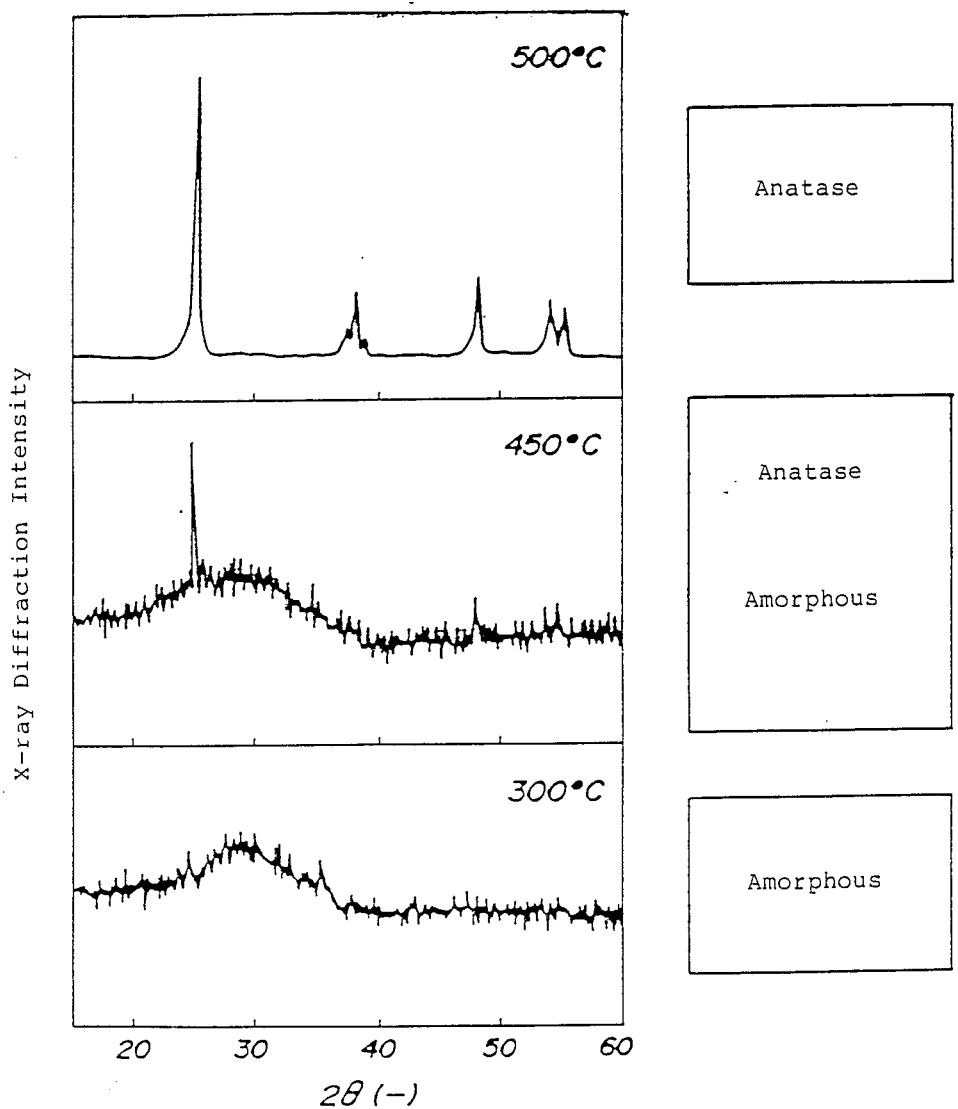
FIG. 45 is an X-ray diffraction diagram showing the relationship between the reaction temperature and crystalline morphology of the products in Example 18.

As is mentioned above, the product contained an amorphous phase and a crystalline phase as a mixture while the ultra-fine particles of the crystalline titanium oxide could be readily obtained by increasing the reaction temperature. FIG. 45 shows the relationship between the reaction temperature and the crystalline form. It is presumable from this result that formation of anatase begins at a reaction temperature of about 400° to 450° C. Further, the amorphous particles can readily be transformed into crystalline particles by subjecting to a heat treatment at a temperature of 400° to 450° C. or higher.

EXAMPLE 19

Figure 46:
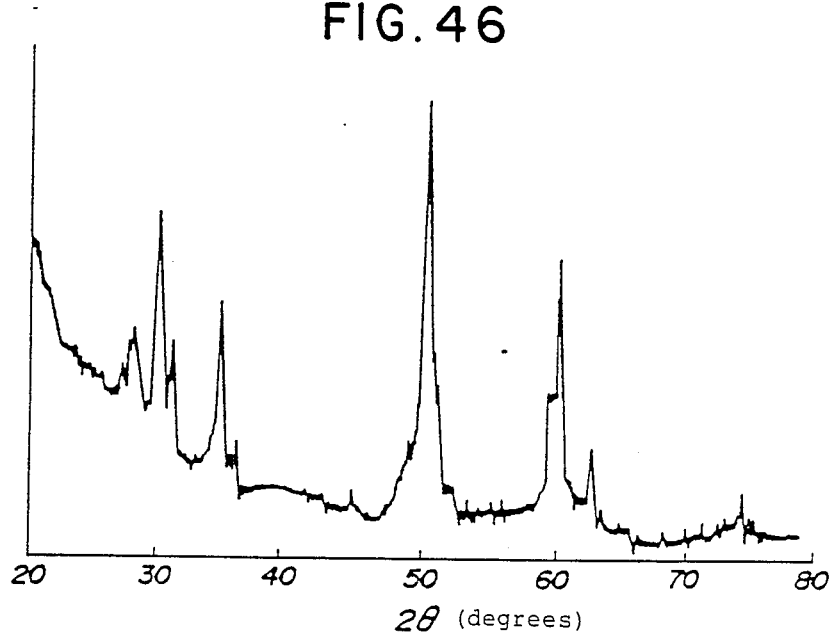
FIG. 46 is an X-ray diffraction diagram of the fine particles of zirconium oxide obtained in Example 19.

The same procedure as in Example 13 was undertaken except that zirconium tetraisopropoxide was used as the starting material and the temperature of vaporization of the starting material was 250° C. and the reaction temperature was 450° C. The conditions in this case and the properties of the product are shown in Table 2. FIG. 46 shows an X-ray diffraction diagram of the product.

EXAMPLES 20 to 23

Example 9 was modified by increasing the feed rate of the starting material to give a concentration of the starting material of 0.1, 0.4, 0.8 or 1.2% by moles in the gaseous phase in the reaction. The temperature of water in the steam generator was 90° C. Accordingly, the concentration of water vapor was 26% by moles in the $N_2$ gas as the carrier and 13% by moles in the gaseous phase of the reaction. These conditions and the properties of the products are shown in Table 2.

EXAMPLE 24

The same procedure as in Example 10 was undertaken except that the reaction temperature was 500° C. The product was identified by the X-ray diffractometry to be formed of ultra-fine particles of anatase-type titanium oxide. The result of the X-ray diffractometry is shown in the uppermost part of FIG. 45. The conditions and properties of the product are shown in Table 2.

COMPARATIVE EXAMPLES 7 and 8.

The same procedure as in Example 24 was undertaken except that the reaction temperature in Example 24 was modified to 700° C. in Comparative Example 7 or to 900° C. in Comparative Example 8. These conditions and the properties of the products are shown in Table 2.

TABLE 2

Figure 21:
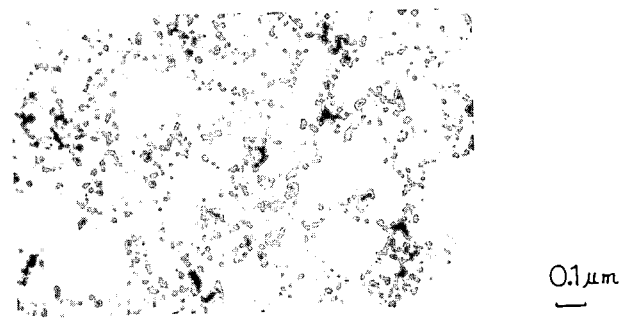
FIGS. 21 to 43 are electron microphotographs showing the particulate structure of the fine particles of titanium oxide obtained in various Examples hereof.
Figure 22:
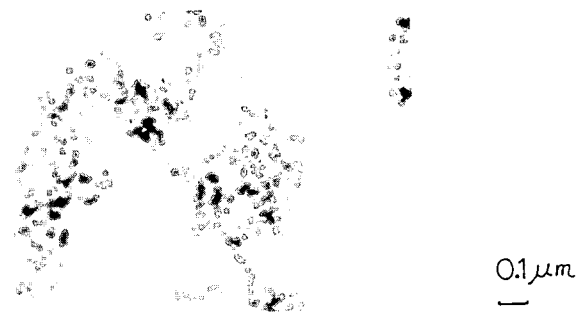
Figure 23:
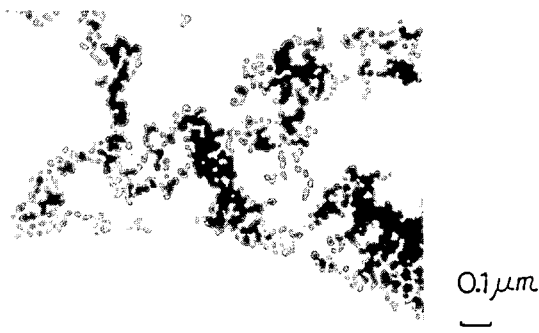
Figure 24:
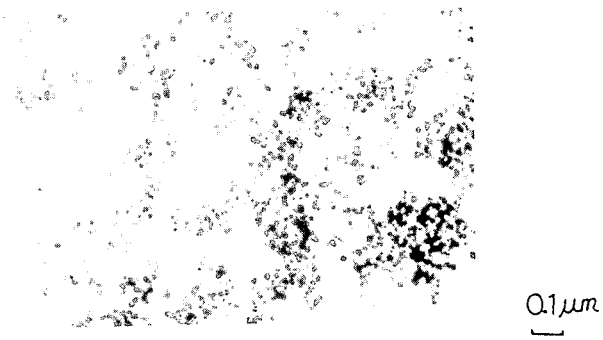
Figure 25:
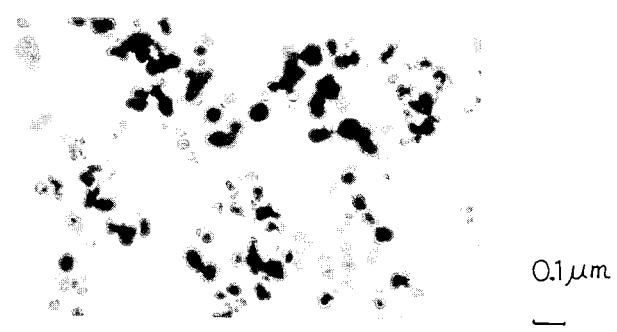
Figure 26:
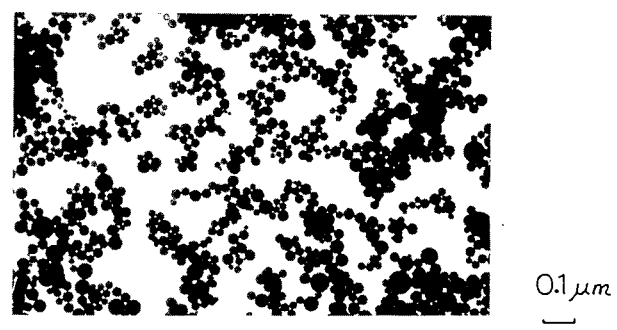
Figure 27:
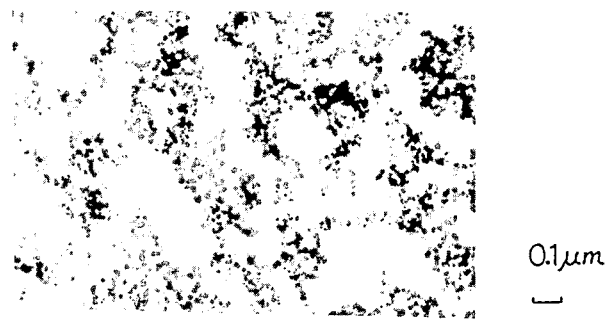
Figure 28:
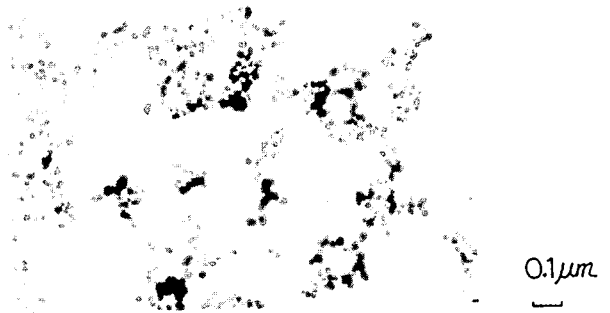
Figure 29:
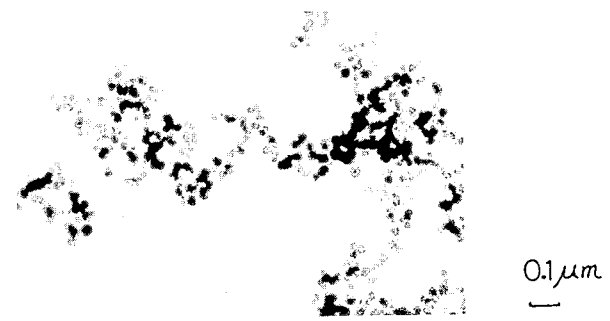
Figure 30:
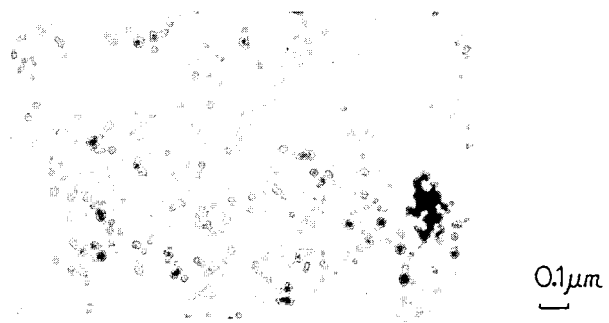
Figure 31:
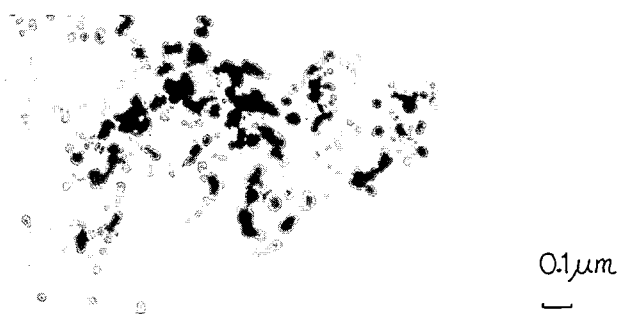
Figure 32:
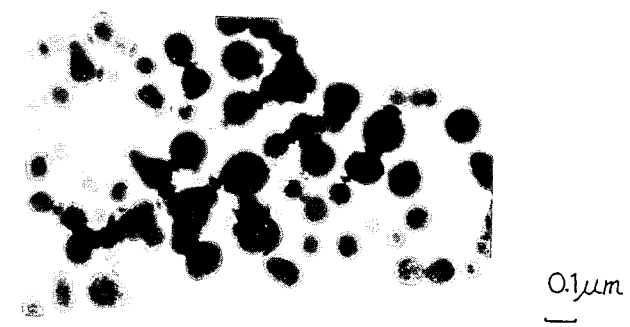
Figure 33:
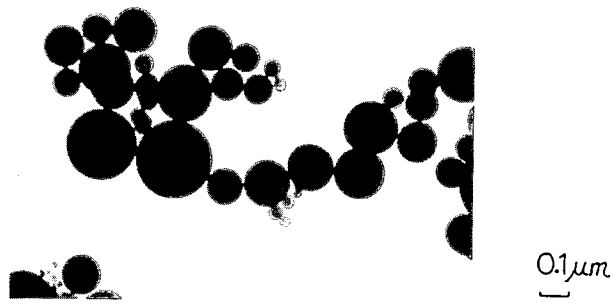

| | | Example | | | | Comparative Example | | Example | | | | | | | | Comparative Example | | |
|---|---|---|---|---|---|---|---|---|---|---|---|---|---|---|---|---|---|---|
| | | 8 | 9 | 10 | 11 | 3 | 4 | 12 | 13 | 14 | 15 | 16 | 5 | 6 |
| Reaction conditions | Starting material | Ti(OC₃H₇)₄ | Ti(OC₃H₇)₄ | Ti(OC₃H₇)₄ | Zr(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ |
| | Concentration of starting material in gaseous phase in reaction (% by moles) | 0.06 | 0.06 | 0.06 | 0.06 | 0.06 | 0.06 | 0.06 | 0.06 | 0.06 | 0.06 | 0.06 | 0.06 | 0.06 |
| | Molar ratio of added water vapor to starting material | 30 | 55 | 120 | 220 | 0 | 5 | 30 | 30 | 30 | 30 | 30 | 30 | 30 |
| | Staying time (seconds) | 0.3 | 0.3 | 0.3 | 0.3 | 0.3 | 0.3 | 0.1 | 0.6 | 1.0 | 2.0 | 4.0 | 6.0 | 0.3 |
| | Reaction temperature (°C.) | 300 | 300 | 300 | 300 | 350 | 300 | 300 | 300 | 300 | 300 | 300 | 300 | 300 |
| | Cooling after reaction | yes | yes | yes | yes | yes | yes | yes | yes | yes | yes | yes | yes | no |
| Properties of product | Product | TiO₂ | TiO₂ | TiO₂ | ZrO₂ | TiO₂ | TiO₂ | TiO₂ | TiO₂ | TiO₂ | TiO₂ | TiO₂ | TiO₂ | TiO₂ |
| | Crystalline form | Amorphous | Amorphous | Amorphous | Amorphous | Amorphous | Amorphous | Amorphous | Amorphous | Amorphous | Amorphous | Amorphous | Amorphous | Amorphous |
| | Particle form | Spherical | Spherical | Spherical | Spherical | Spherical | Spherical | Spherical | Spherical | Spherical | Spherical | Spherical | Spherical | Spherical |
| | Average particle diameter (Å) | 200 | 200 | 200 | 200 | 200 | 200 | 100 | 250 | 300 | 350 | 400 | 1000 | 1000 |
| | Particle diameter distribution (nm)* | 10–30 | 15–25 | 15–25 | 15–25 | 10–100 | 10–50 | 5–20 | 20–30 | 25–35 | 30–45 | 30–50 | 80–120 | 30–200 |
| | Specific surface area (m²/g) | 120 | — | 180 | 240 | 130 | — | 300 | — | 110 | — | 100 | 50 | 60 |
| | Yield (%) | 92 | 96 | 96 | 96 | 18 | 90 | 85 | 95 | 96 | 96 | 98 | 98 | 92 |
| | Electron microphotograph | FIG. 21 | FIG. 22 | FIG. 23 | FIG. 24 | FIG. 25 | FIG. 26 | FIG. 27 | FIG. 28 | FIG. 29 | FIG. 30 | FIG. 31 | FIG. 32 | FIG. 33 |
| | UV absorbance** | 0.38 | 0.45 | 0.48 | 0.46 | 0.32 | 0.34 | | | | | | | |

| | | Example | | | | | | Comparative Example | |
|---|---|---|---|---|---|---|---|---|---|
| | | 17 | 18 | 19 | 20 | 21 | 22 | 23 | 24 | 7 | 8 |
| Reaction conditions | Starting material | Ti(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ | Ti(OC₃H₇)₄ |
| | Concentration of starting material in gaseous phase in reaction (% by moles) | 0.06 | 0.06 | 0.06 | 0.1 | 0.4 | 0.8 | 1.2 | 0.06 | 0.06 | 0.06 |
| | Molar ratio of added water vapor to starting material | 220 | 0 | 30 | 130 | 32 | 16 | 11 | 120 | 120 | 120 |
| | Staying time (seconds) | 0.3 | 0.3 | 0.6 | 0.3 | 0.3 | 0.3 | 0.3 | 0.3 | 0.3 | 0.3 |
| | Reaction temperature (°C.) | 350 | 450 | 450 | 300 | 300 | 300 | 300 | 500 | 700 | 900 |
| | Cooling after reaction | yes | yes | yes | yes | yes | yes | yes | yes | yes | yes |
| Properties of product | Product | TiO₂ | TiO₂ | ZrO₂ | TiO₂ | TiO₂ | TiO₂ | TiO₂ | TiO₂ | TiO₂ | TiO₂ |
| | Crystalline form | Amorphous | Amorphous Anatase | Crystalline | Amorphous | Amorphous | Amorphous | Amorphous | Anatase | Anatase | Anatase |
| | Particle form | Spherical | Spherical | Spherical | Spherical | Spherical | Spherical | Spherical | Spherical | Irregular Spherical | Irregular Spherical |

TABLE 2-continued

Figure 34:
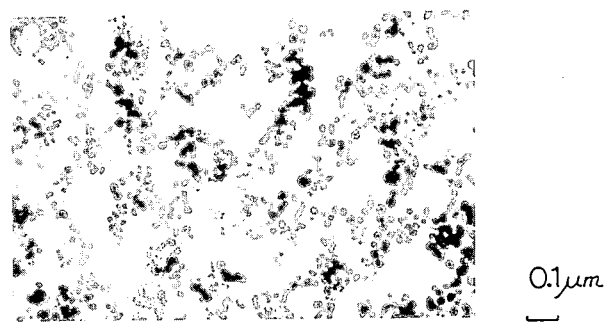
Figure 35:
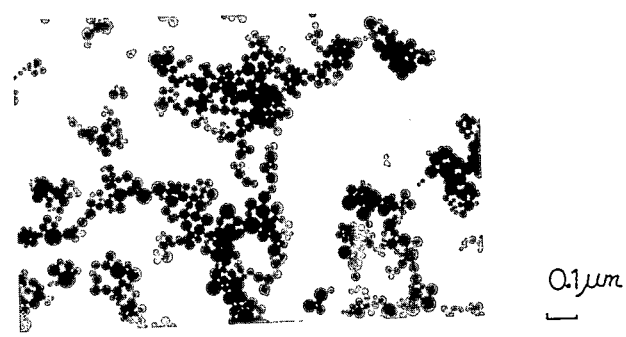
Figure 36:
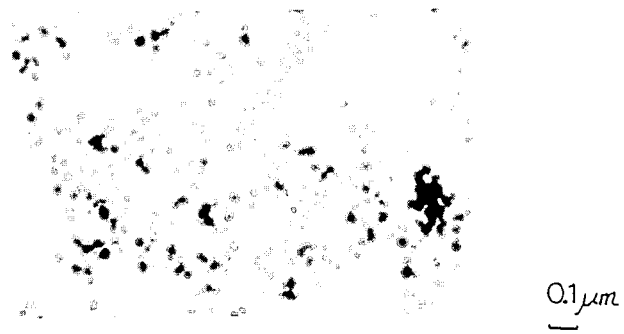
Figure 37:
Figure 38:
Figure 39:
Figure 40:
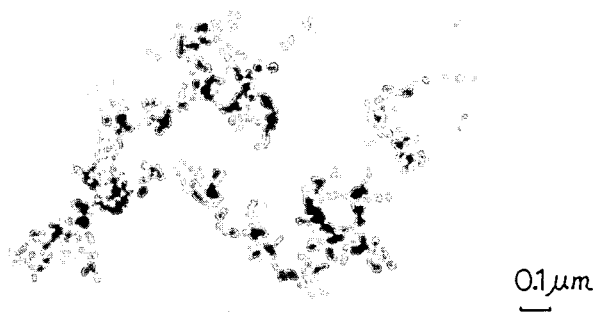
Figure 41:
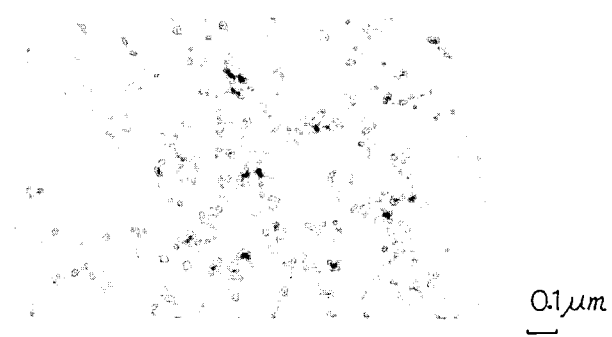
Figure 42:
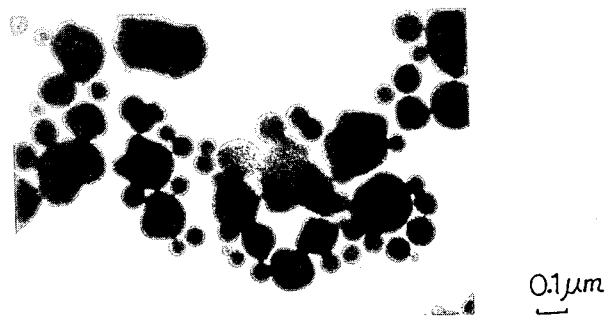
Figure 43:
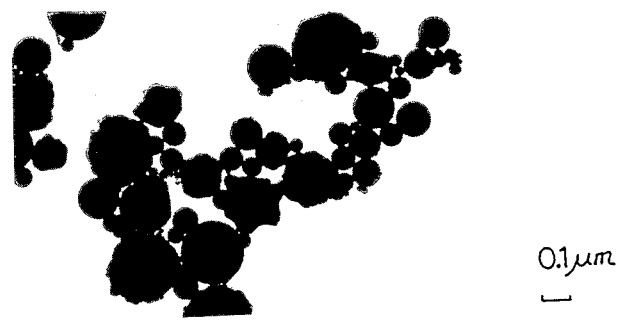

| | | | | | | | | | |
|---|---|---|---|---|---|---|---|---|---|
| Average particle diameter (Å) | 250 | 200 | 300 | 200 | 280 | 330 | 400 | 250 | 1100 | 1200 |
| Particle diameter distribution (nm)* | 10-30 | 10-50 | 20-40 | 15-25 | 20-35 | 25-40 | 25-50 | 10-30 | 30-150 | 30-180 |
| Specific surface area (m²/g) | 170 | 50 | 180 | — | — | — | — | 60 | 30 | 20 |
| Yield (%) | 98 | 98 | 96 | 96 | 96 | 93 | 90 | 95 | 98 | 98 |
| Electron micro-photograph | FIG. 34 | FIG. 35 | FIG. 36 | FIG. 37 | FIG. 38 | FIG. 39 | FIG. 40 | FIG. 41 | FIG. 42 | FIG. 43 |
| UV absorbance** (300 nm) | — | — | — | — | — | — | — | — | — | — |

*95% weight distribution
**Larger value means larger UV scattering or shielding effect.

EXAMPLE 25

Each of the six samples of titanium oxide powder having an average particle diameter of 20 nm obtained in Examples 8 to 11 and Comparative Examples 3 and 4 was suspended in castor oil and thoroughly milled using a three-roller mill and the thus formed slurry was weighed and further milled with admixture of castor oil to give a content of the ultra-fine particles of 1% by weight, with which a thin film of 5 μm thickness was formed on a transparent quartz glass plate by use of an applicator.

This coating film was subjected to the measurement of the absorbance in the wave length region of 280 to 700 nm by use of a double-beam spectrophotometer Model Hitachi 228. FIG. 47 shows a part of the thus obtained results. These results indicated that the UV absorbance at 300 nm of each of the above mentioned samples was 0.32 to 0.48.

COMPARATIVE EXAMPLE 9

The same procedure as in Example 25 was undertaken by use of an ultra-fine particle product Titania P-25 manufactured by DEGUSSA Co., West Germany (mixed product of rutile and anatase, indefinite crystalline form having a particle diameter distribution of 15 to 50 nm and an average particle diameter of 30 nm), which was hitherto known as a product having the highest effect of ultraviolet scattering. The absorbance was also measured within a wave length region of 280 to 700 nm. The results are shown in FIG. 47. As is shown in this figure, the particles had a UV absorbance of 0.24 at 300 nm.

In the following, application examples are shown. The proportion of each component formulated in the application examples is given in % by weight.

APPLICATION EXAMPLE 1

A milky lotion was prepared in the following formulation.
  Stearic acid: 2.4%
  Cetyl alcohol: 1.0%
  Vaseline: 5.5%
  Liquid paraffin: 12.0%
  Polyoxyethylene monooleyl ester: 2.0%
  Polyethylene gylcol 1500: 3.5%
  Triethanol amine: 1.5%
  Purified water: 72.0%
  Amorphous, spherical titanium oxide (particle diameter 0.2 to 0.3 μm): 0.1%
  Perfume: optional amount Polyethylene glycol and triethanol amine are added to purified water and dissolved by heating to be kept at 70° C. (aqueous phase). Separately, the other components are mixed together and melted by heating to be kept at 70° C. (oily phase).

Then, the oily phase was added to the aqueous phase to be preliminarily emulsified and homogeneously emulsified by ultra-sonic vibration followed by cooling to room temperature under agitation.

In the next place, a slurry containing 10% by weight of the above mentioned amorphous and spherical titanium oxide milled with castor oil was applied to the black surface of a color matching panel in a thickness of 0.076 mm by use of an applicator and the color tone in the visible light was measured on a color analyzer Model 607 manufactured by Hitachi Ltd. For comparison, measurement of the color tone in the visible light was performed in the same manner using a fine particle product of titanium oxide manufactured by Degussa Co., West Germany (a mixed crystalline product of rutile and anatase, average particle diameter about 0.3 μm, trade name P-25). The results are shown together in FIG. 48.

It is understood from FIG. 48 that, while the fine particles of the conventional titanium oxide have a bluish tint, the amorphous and spherical titanium oxide of the present invention is excellent in the higher transparency.

APPLICATION EXAMPLE 2

A foundation cream was prepared in the following formulation.
  Talc: 15.0%
  Kaolin: 4.0%
  Amorphous, spherical titanium oxide (particle diameter 0.2 to 0.3 μm): 20.0%
  Iron oxide (red): 0.3%
  Iron oxide (yellow): 0.7%
  Iron oxide (black): 0.03%
  Solid paraffin: 3.0%
  Lanolin: 10.0%
  Liquid paraffin: 27.0%
  Glyceryl monooleyl ester: 5.0%
  Purified water: 15.0%
  Perfume: optional amount Talc, kaolin, amorphous titanium oxide and iron oxides (red, yellow and black) are mixed together and treated in a ball mill (powdery part). The powdery part is admixed with a part of the liquid paraffin and glyceryl monooleyl ester to be uniformly dispersed using a homomixer followed by further admixture of the other components molten by heating excepting purified water and kept at 70° C. (oily phase). The purified water is heated at 70° C. and added to the oily phase to be uniformly dispersed and emulsified using a homomixer and kept at 40° C. under agitation.

A coating film having a thickness of 5 μm was formed of this foundation cream on a transparent quartz glass plate and subjected to the measurement of the absorbance in the wave length region of 200 to 400 nm using a double beam spectrophotometer Model Hitachi 228.

For comparison, another foundation cream was prepared using another titanium oxide having the same particle diameter but different in the crystalline form and subjected to the measurement in the same method.

FIG. 49 shows the results of the measurements. The curve A is for the foundation cream by use of the amorphous titanium oxide according to the present invention and the curves B and C are for those by use of an anatase-type titanium oxide and rutile-type titanium oxide, respectively. As is clear from this figure, a larger absorbance in the vicinity of 290 nm (the wave length of ultraviolet light having the strongest biological effect) is obtained by use of the amorphous titanium oxide than by use of the rutile-type and anatase-type titanium oxides. The reason therefor is presumably the higher dispersibility of the amorphous titanium oxide in the base oil of cosmetics.

In the next place, the above mentioned three foundation creams were subjected to the test of the ultraviolet shielding effect in actual use by applying 0.1 g thereof to 1 cm$^2$ of the skin. The test was undertaken on July 29, 1984 (fine weather) on Futtsu Beach, Futtsu-shi, Chiba-ken, and the skin coated with the sample was exposed to sun light for 2 hours from 11.00 a.m. to 1.00 p.m. followed by removal of the sample and the condition of sunburn, i.e. strength of erythema, was examined visually twice after 1 hour and after 1 day. The results are shown in Table 3.

TABLE 3

| Sample | After 1 hour | After 1 day |
|---|---|---|
| Amorphous titanium oxide used | ○ | ○ |
| Anatase-type titanium oxide used | Δ | Δ |
| Rutile-type titanium oxide used | x | x |

○: Absolutely no erythema was noted.
Δ: Weak erythema was noted.
x: Somewhat strong erythema was noted.

As is clear from the table, the foundation by use of the amorphous titanium oxide of the present invention exhibits excellent effect of ultraviolet shielding in the actual use.

APPLICATION EXAMPLE 3

A lip stick was prepared according to the following formulation.
Red #204: 1.0%
Orange #203: 1.0%
Red #223: 1.0%
Candelilla wax: 10.0%
Solid paraffin: 8.0%
Beeswax: 6.0%
Carnauba wax: 5.0%
Lanolin: 12.0%
Castor oil: 43.0%
Isopropyl ester of oleic acid: 5.0%
Amorphous, spherical titanium oxide (particle diameter 0.2–0.3 μm; specific surface area 200 m²/g): 8.0%

The amorphous and spherical titanium oxide, red #204 and orange #203 are added to a part of the castor oil and treated with a roller mill (pigment part). Separately, red #223 is dissolved in a part of the castor oil (dye part). The remainder of the components mixed together is melted by heating and then admixed with the pigment part and the dye part to be uniformly dispersed by use of a homomixer. After dispersion, the melt is cast into a mold and quenched and the stick-like body is inserted into a casing and subjected to framing.

APPLICATION EXAMPLE 4

A cream was prepared according to the following formulation.
Microcrystalline wax: 10.0%
Beeswax: 3.0%
Vaseline: 4.0%
Hydrogenated lanolin: 8.0%
Squalane: 30.0%
Glyceryl monooleyl ester: 3.0%
Hexadecyl adipate: 7.0%
Polyoxyethylene sorbitan monooleate: 0.5%
Propylene glycol: 3.5%
Purified water: 20.0%
Amorphous, spherical titanium oxide (particle diameter 0.2–0.3 μm): 11.0%
Perfume: optional amount The purified water admixed with propylene glycol is heated and kept at 70° C. (aqueous phase). The other components mixed together are melted by heating and kept at 70° C. (oil phase). The oily phase admixed with the aqueous phase was preliminarily emulsified and then homogeneously emulsified using a homomixer followed by agitation during cooling.

This cream was subjected to evaluation in actual use in respect of "spreadability", "adhesion", "refreshingness" and "overall evaluation". For comparison, furthermore, additional creams were prepared according to the above described formulation by use of titanium oxides having the same particle diameter but different in the crystalline form and they were evaluated in the same method. The evaluation was undertaken by 10 female panel members using the three kinds of the creams and recording was made of the number of the panel members who reported the best results in each of the items. The results are shown in Table 4.

TABLE 4

| Sample | Spreadability | Adhesion | Refreshingness | Overll evaluation |
|---|---|---|---|---|
| Amorphous titanium oxide used | 7 | 5 | 6 | 8 |
| Anatase-type titanium oxide used | 1 | 3 | 2 | 1 |
| Rutile-type titanium oxide used | 2 | 2 | 2 | 1 |

As is clear from the table, the cream by use of the amorphous and spherical titanium oxide of the present invention is highly excellent also in the actual use.

APPLICATION EXAMPLE 5

A solid face powder was prepared according to the following formulation.
Talc: 45.0%
Amorphous, spherical titanium oxide (particle diameter 0.2–0.3 μm): 43.0%
Iron oxide (red): 1.0%
Iron oxide (yellow): 2.5%
Iron oxide (black): 0.5%
Stearic acid: 2.0%
Squalane: 2.5%
Lanolin: 1.0%
Hexadecyl oleate ester: 0.5%
Triethanol amine: 1.0%
Perfume: optional amount The talc, amorphous and spherical titanium oxide and iron oxides are thoroughly blended in a blender and, while under mixing, the other components as mixed together are uniformly added thereto followed by further thorough mixing. Thereafter, the mixture is treated in a pulverizing machine and shaped by compression molding in a press.

APPLICATION EXAMPLE 6

An eyeshadow in the form of a stick was prepared according to the following formulation.
Ceresin: 27%
Castor oil: 42%
Hydrogenated oil: 5%
Carnauba wax: 3%
Liquid paraffin: 6%
Amorphous, spherical titanium oxide (particle diameter 0.2–0.3 μm): 9%
Iron oxide (ochre): 4%
Iron oxide (sienna): 4%
Perfume: optional amount The amorphous and spherical titanium oxide and the ochre and sienna iron oxides are added to a part of the castor oil and treated on a roller mill (pigment part). The other components are mixed together and melted by heating and the pigment part is added thereto and uniformly dispersed using a homomixer. Thereafter, it is cast into a mold and quenched to be shaped into a stick-like form.

APPLICATION EXAMPLE 7

A compact of rouge was prepared according to the following formulation.
Talc: 48%
Kaolin: 16%
Chalk: 3%
Magnesium carbonate: 4%
Zinc stearate: 5%
Amorphous, spherical titanium oxide (particle diameter 0.2–0.3 μm; specific surface area 200 m²/g): 13%
Coloring agent: 11%
Perfume: optional amount Into the talc, amorphous and spherical titanium oxide and coloring agent under thorough blending is uniformly added the mixture of the other components and blending is further continued thoroughly. In the next place, pulverization is followed by compression molding in a press.

The above described cheek rouge was subjected to the evaluation of the perfume retentivity by actual use. For comparison, in addition, evaluation was performed in the same method of another cheek rouge prepared in the same manner using a rutile-type titanium oxide manufactured by the sulfuric acid process and having a particle diameter of 1 to 2 μm and a specific surface area of 10 m²/g. The evaluation was undertaken by 10 female panel members using the two compact rouges who were asked to report the perfume retentivity after 8 hours and the number of the panel members who gave a report of good retentivity is shown in Table 5.

TABLE 5

| Sample | Perfume retentivity |
|---|---|
| Amorphous titanium oxide | 8 |
| Rutile-type titanium oxide | 2 |

As is clear from the table, the compact rouge by use of the amorphous and spherical titanium oxide of the present invention is very excellent in the perfume retentivity. It is presumable that the large specific surface area and the well-developed pores (porosity) of the amorphous titanium oxide may contribute to the retention of the perfume inside the pores.

REFERENCE EXAMPLE 1

In order to examine the dispersibility of titanium oxides in oils widely used as a base of cosmetics, test was performed by use of the three kinds of titanium oxide each having a particle diameter of 0.2 to 0.3 μm but different in the crystalline form as is shown in Application Example 2.

The test was performed by taking 1 g of the titanium oxide into a 50 ml graduated sedimentation tube (Ukena tube) with addition of 50 ml of the oil and, after agitation and dispersing by use of a dispersing machine, standing the tube to examine the state of dispersion 7 times after 1 minute, 5 minutes, 30 minutes, 60 minutes, 1 day, 3 days and 7 days. The evaluation was performed in the 10-rating method giving 10 points to very good dispersibility and 1 point to poor dispersibility as a total of the evaluation points obtained in each moment of observation, the evaluation point being 5 when no particle settling was found and 1 when the particles had entirely settled or settled in the form of agglomerates. The results are shown in Table 6.

TABLE 6

| Sample | Liquid paraffin | Squalane | Castor oil |
|---|---|---|---|
| Anatase-type | 1 | 2 | 3 |
| Rutile-type | 1 | 1 | 2 |
| Amorphous | 9 | 9 | 8 |

As is clear from the table, the amorphous titanium oxide exhibited very good dispersibility in the base oils widely used in cosmetics.

Titanium oxides should preferably have a specific gravity as small as possible from the standpoint of advantageously preventing sedimentation thereof in oils because many of the base oils for cosmetics have a specific gravity in the vicinity of 1. In this regard, the above mentioned samples were each subjected to the determination of the true density by the He substitution method using a pentapycnometer manufactured by Quantachrome Co., U.S.A., after a pretreatment for dehydration at 115° C. for 4 hours to find values of the true specific gravity of 3.9, 4.2 and 2.9 for the anatase-type, rutile-type and amorphous titanium oxides, respectively. Such a small true specific gravity of the amorphous titanium oxide may be the reason for the above described results.

REFERENCE EXAMPLE 2

In order to evaluate the stability of titanium oxides against light, evaluation was performed of the foundations prepared by using the three kinds of titanium oxides having different crystalline forms as is shown in Example 2. The three samples were irradiated at 50° C. for 90 hours under a xenon lamp and the degree of blackening thereof was examine. The results are shown in Table 7.

TABLE 7

| Sample | Degree of blackening |
|---|---|
| Amorphous, spherical titanium oxide used | Almost no blackening |
| Rutile-type titanium oxide used | Blackening over whole surface |
| Anatase-type titanium oxide used | Blackening over whole surface |

As is clear from the table, the sample by use of the amorphous and spherical titanium oxide has also excellent stability against light.

APPLICATION EXAMPLES 8 TO 12 AND REFERENCE EXAMPLE 3

Following tests were undertaken by use of five kinds of amorphous and spherical titanium oxides having different particle diameters as shown in Table 8 (Application Examples 8 to 12) and a fine-article titanium oxide manufactured by Degussa Co., West Germany which was a crystalline mixture of anatase and rutile having a particle diameter of 0.02 to 0.04 μm, trade name P-25

REFERENCE EXAMPLE 3

(1) Shielding Power Against Ultraviolet Light (UV)

Foundation creams were prepared each in the same formulation as described in Application Example 2 and the absorbance of the foundation creams was measured in the same method as described in Application Example 2 to examine the shielding effect against UV. Evaluation of the UV shielding power was performed with a mark of ○ for an absorbance of 2.8 or larger, with a mark of ○ for an absorbance of 2.7 to 2.5, with a mark of Δ for an absorbance of 2.4 to 2.0 and with a mark of x for an absorbance of 1.9 or smaller at 300 mm (abridged as UV-B). Further, evaluation was made with a mark of ○ for an absorbance of 1.8 or larger, with a mark of ○ for an absorbance of 1.7 to 1.5, with a mark of Δ for an absorbance of 1.4 to 1.0 and with a mark of x for an absorbance of 0.9 or smaller at 360 mm (abridged as UV-A). The results of evaluation are shown in Table 8. As is clear from Table 8, it is understood that the amorphous and spherical titanium oxides of the present invention have excellent shielding effect against both of UV-A and UV-B by selecting the particle size in comparison with the widely used conventional titanium oxide.

(2) Dispersibility in Base Oils of Cosmetics

In order to examine the dispersibility in base oils of cosmetics, tests were undertaken in the same method and criteria for evaluation as described in Reference Example 1. The results are shown in Table 8. As is clear from Table 8, it is understood that the amorphous and spherical titanium oxides of the present invention can be satisfactorily dispersed in the base oils of cosmetics.

(3) Transmissivity of Visible Light

As is described above, conventional fine-particle titanium oxides exhibited pale bluish coloring by the interferential light and had almost no effect of increasing the bright appearance of the skin. In this regard, transmissivity of visible light was examined by use of the two kinds of amorphous and spherical titanium oxides of Application Examples 8 and 9 having different particle diameters and the titanium oxide of Reference Example 3. As the method therefor, 4 g of each titanium oxide were suspended in 6 g of castor oil followed by thorough mixing by use of a three-roller mill. A 0.25 g portion of the thus milled slurry was weighed into 0.75 g of castor oil and fully dispersed by use of an ointment spatula. The dispersion fluid was applied to the black surface of a color matching panel in a thickness of 0.076 mm by use of an applicator and the coating film was subjected to the measurement of the reflectance by use of a color analyzer Model 607 manufactured by Hitachi Ltd. The results of the measurements are shown in FIG. 50. As is clear from the figure, it is understood that the amorphous and spherical titanium oxide of the present invention has a high transmissivity of visible light and, moreover, the reflectance is low in the bluish range of 400 to 500 nm. As a consequence thereof, it is reasonable that the amorphous and spherical titanium oxide does not appear pale-bluish while conventional titanium oxides appear pale-bluish.

(4) Perfume Retentivity

Compact rouges were prepared each in the same formulation as described in Application Example 7 and the perfume retentivity of the compact rouges was evaluated in the same method as in Application Example 7. The results of the evaluation are shown in Table 8.

As is clear from Table 8, the compact rouge by use of the amorphous and spherical titanium oxide of the present invention exhibited very high perfume retentivity. The perfume retentivity was even higher when the specific surface area of the amorphous and spherical titanium oxide was larger. The reason therefor is presumably that the amorphous and spherical titanium oxide is porous so that the perfume is retained in the pores.

(5) Actual Usability

Creams were prepared each in the same formulation as described in Application Example 4 and the actual usability of the creams was examined in the same method as in Application Example 4 to make evaluation in the same criteria. The results of the evaluation are shown in Table 8. As is clear from Table 8, the creams by use of the amorphous and spherical titanium oxides of the present invention were outstandingly excellent in the actual use in each of the "spreadability", "adhesion", "refreshingness" and "overall evaluation".

FIGS. 51 to 63 show the electron microphotographs, high-magnification electron microphotographs, electron diffraction diagrams and X-ray diffraction diagrams of the titanium oxides used in Application Examples 8 to 12 and Reference Example 3.

TABLE 8

| Application Example | Particle diameter, μm | Crystalline form | Specific surface area, m²/g | True density g/cm³ | Form | Dispersibility in base oil of cosmetics Squalane | Liquid paraffin | Castor oil | UV shielding UV-B | UV-A | Perfume retentivity | Spreadability | Adhesion | Refreshingness | Overall evaluation |
|---|---|---|---|---|---|---|---|---|---|---|---|---|---|---|---|
| 8 | 0.01–0.03 | Amorphous | 250 | 2.9 | Spherical | 9 | 9 | 9 | | Δ | 10 | 6 | 4 | 4 | 7 |
| 9 | 0.04–0.06 | Amorphous | 220 | 3.0 | Spherical | 9 | 9 | 8 | | | 9 | 6 | 4 | 5 | 7 |
| 10 | 0.1–0.3 | Amorphous | 200 | 3.0 | Spherical | 9 | 9 | 8 | | | 8 | 7 | 5 | 6 | 8 |
| 11 | 0.3–0.5 | Amorphous | 190 | 3.1 | Spherical | 8 | 8 | 7 | Δ | | 7 | 8 | 6 | 8 | 8 |
| 12 | 0.7–0.9 | Amorphous | 180 | 3.1 | Spherical | 7 | 7 | 7 | Δ | | 6 | 9 | 7 | 9 | 9 |
| Reference Example 3 | 0.02–0.04 (P-25, DEGUSSA Co., West Germany) | Crystalline mixture of anatase and rutile | 50 | 4.0 | Cubic | 3 | 3 | 4 | | x | 4 | 1 | 2 | 1 | 1 |

APPLICATION EXAMPLE 13

The same procedure as in Application Example 1 was undertaken except that the spherical titanium oxide here used was that obtained in Example 14. FIG. 64 shows the results of the measurement of the color tone in the visible light. As is clear from the figure, the titanium oxide of the present invention is superior in the transparency to the fine particles of conventional titanium oxides which exhibit bluish tint. FIG. 63 shows the result of the X-ray diffractometry of the comparative titanium oxide (trade name: P-25).

REFERENCE EXAMPLE 4

Foundation creams were prepared in the formulation shown in Application Example 2 using, as the spherical titanium oxide, (A) the amorphous titanium oxide obtained in Example 8, (B) the titanium oxide as a mixture of the amorphous and anatase-type one obtained in Example 18 or (C) the anatase-type titanium oxide obtained in Example 24 and the absorbance thereof was measured in the same manner. For comparison, the same procedure was undertaken by use of (D) the titanium oxide of Degussa Co, West Germany (trade name: P-25) and (E) the rutile-type titanium oxide obtained by the calcination of the P-25 at 1200° C. for 1 hour. The results of measurements are shown in FIG. 65. As is clear from the figure, the spherical titanium oxide of the present invention exhibits higher absorbance than the conventional titanium oxides in the vicinity of 290 nm which is the wave length of ultraviolet light having the strongest biological effects. This is presumably due to the higher dispersibility of the inventive titanium oxide in the base oils of cosmetics as a result of the definite spherical form of the particles with a narrow particle diameter distribution. Further, this spherical titanium oxide presumably has a surface property with excellent optical characteristics of scattering of ultraviolet light.

REFERENCE EXAMPLE 5

In order to investigate the dispersibility of titanium oxides in oils widely used as a base material of cosmetics, tests were undertaken by use of the three kinds of titanium oxides (A), (D) and (E) shown in the above described Reference Example 4 having different crystalline forms but each having the same particle diameter of 20 to 30 nm. The experiments were undertaken in the same manner as shown in Reference Example 1. The results are shown in Table 9.

TABLE 9

| Sample | Liquid paraffin | Squalane | Castor oil |
|---|---|---|---|
| A | 9 | 9 | 8 |
| D | 3 | 3 | 4 |
| E | 1 | 1 | 2 |

As is clear from the table, the amorphous and spherical titanium oxide (A) of the present invention exhibited very good dispersibility in the widely used base oils of cosmetics. The true specific gravities determined in the same manner as in Reference Example 1 were 3.9 for the anatase-type (D), 4.2 for the rutile type (E) and 2.9 for the amorphous one (A).

APPLICATION EXAMPLES 14 to 18

Tests were undertaken in the method as shown in Application Examples 8 to 12 by use of the fine particles of the three kinds of amorphous titanium oxides obtained in Examples 8, 10, 16, 18 and 24. The results are shown in Table 10. The test of the transmissivity of visible light (3) was undertaken by use of the two kinds of the spherical titanium oxides of Example 8 (A) and Example 24 (B) having the same particle diameter but having different crystalline forms and the comparative titanium oxide (C) (trade name P-25). The results are shown in FIG. 66.

As is clear from the table, the same results were obtained in each of the testing results as in the cases of Application Examples 8 to 12 and Reference Example 3 to indicate the superiority of the inventive titanium oxide.

TABLE 10

| Application Example | Particle diameter, μm | Crystalline form | Specific surface area, m²/g | True density, g/cm³ | Form | Dispersibility in base oil of cosmetics | | |
|---|---|---|---|---|---|---|---|---|
| | | | | | | Squalane | Liquid paraffin | Castor oil |
| 14 | 0.01–0.03 | Amorphous | 120 | 3.0 | Spherical | 8 | 8 | 9 |
| 15 | 0.015–0.025 | Amorphous | 180 | 2.9 | Spherical | 9 | 9 | 9 |
| 16 | 0.03–0.05 | Amorphous | 100 | 3.2 | Spherical | 9 | 8 | 9 |
| 17 | 0.01–0.05 | Amorphous /anatase mixed | 120 | 3.4 | Spherical | 7 | 8 | 8 |
| 18 | 0.01–0.03 | Anatase | 80 | 3.9 | Spherical | 6 | 7 | 7 |

| Application Example | UV shielding UV-B | UV shielding UV-A | Perfume retentivity | Spreadability | Adhesion | Refreshingness | Overall evaluation | Remarks |
|---|---|---|---|---|---|---|---|---|
| 14 | | | 7 | 8 | 8 | 7 | 8 | Sample of Example 8 |

TABLE 10-continued

| | | | | | | | |
|---|---|---|---|---|---|---|---|
| 15 | | 8 | 8 | 7 | 8 | 9 | Sample of Example 10 |
| 16 | | 6 | 9 | 9 | 8 | 9 | Sample of Example 16 |
| 17 | | 6 | 6 | 6 | 5 | 7 | Sample of Example 18 |
| 18 | Δ | 5 | 6 | 6 | 4 | 7 | Sample of Example 24 |

Possibility of Industrial Utilization

By virtue of the spherical form and the very fine particle diameter, the metal oxide according to the present invention can be placed at the service for a wide range of applications, as is represented by titanium oxide, for example, as a filling material for ultraviolet scattering, anti-wearing solid lubricant, base material of ceramics, white pigment, adsorbent, catalyst, catalyst carrier and the like.

We claim:

1. A method for the preparation of ultra-fine spherical particles of a metal oxide having an average particle diameter of 40 nm or smaller comprising vaporizing a vaporizable metal to form a concentration of 0.06 to 10% by volume and decomposing the vaporizable metal compound by heating to a temperature not exceeding 600° C. in the presence of water vapor in an amount in the range of from 30 to 120 moles per mole of vaporized metal compound to give ultra-fine particles of a metal oxide, the decomposition being immediately followed by cooling by direct quenching with a cooling medium to a temperature not exceeding 100° C. and at which coalescence of the ultra-fine particles of the metal oxide no longer takes place.

2. The method for the preparation according to claim 1 wherein the vaporizable metal compound is selected from the group consisting of titanium alkoxides, titanium halides, zirconium halides, organic zirconium compounds and alkoxides of rare earth metals.

3. The method for the preparation according to claim 1 wherein the decomposition of the vaporizable metal compound is performed in the absence of an oxygen-containing gas in the atmosphere.

4. The method for the preparation according to claim 1 wherein the metal oxide is titanium oxide or zirconium oxide.

5. The method of claim 1 wherein the vaporizable metal compound is heated to a temperature of 250° to 450° C. to decompose said compound.

6. The method of claim 1 wherein the concentration of the vaporizable metal compound is 0.1 to 10% by volume.

7. The method of claim 1 wherein the vaporizable metal compound is heated for decomposition for 0.1 to 10 seconds.

8. The method of claim 7 wherein the heating time is 0.1 to 5 seconds.

* * * * *